(12) United States Patent
Hattori et al.

(10) Patent No.: US 9,986,235 B2
(45) Date of Patent: May 29, 2018

(54) VIDEO DECODING DEVICE AND VIDEO DECODING METHOD

(71) Applicant: Mitsubishi Electric Corporation, Tokyo (JP)

(72) Inventors: Ryoji Hattori, Tokyo (JP); Akira Minezawa, Tokyo (JP); Yusuke Itani, Tokyo (JP); Kazuo Sugimoto, Tokyo (JP); Shunichi Sekiguchi, Tokyo (JP); Yoshimi Moriya, Tokyo (JP); Norimichi Hiwasa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 794 days.

(21) Appl. No.: 14/350,732

(22) PCT Filed: Oct. 30, 2012

(86) PCT No.: PCT/JP2012/078012
§ 371 (c)(1),
(2) Date: Apr. 9, 2014

(87) PCT Pub. No.: WO2013/065673
PCT Pub. Date: May 10, 2013

(65) Prior Publication Data
US 2014/0247875 A1 Sep. 4, 2014

(30) Foreign Application Priority Data

Oct. 31, 2011 (JP) .................................. 2011-239105

(51) Int. Cl.
*H04N 19/86* (2014.01)
*H04N 19/44* (2014.01)
(Continued)

(52) U.S. Cl.
CPC ..... *H04N 19/00533* (2013.01); *H04N 19/117* (2014.11); *H04N 19/172* (2014.11);
(Continued)

(58) Field of Classification Search
CPC ............................ H04N 19/86; H04N 19/174
See application file for complete search history.

(56) References Cited

U.S. PATENT DOCUMENTS

2004/0013310 A1* 1/2004 Suino ........................ G06T 5/20
382/240
2008/0159639 A1* 7/2008 Dvir ...................... H04N 19/176
382/236
(Continued)

FOREIGN PATENT DOCUMENTS

JP 2011-35620 A 2/2011
JP 2014-525151 A 9/2014
(Continued)

OTHER PUBLICATIONS

Bross, et al., "WD4: Working Draft 4 of High-Efficiency Video Coding", JCT-VC of ITU-T SG16 WP3 and ISO/IEC JTC1/SC29/WG11, 6th Meeting: Torino, IT, Oct. 28, 2011, JCTVC-F803_d5, pp. 25, 28-29.

(Continued)

*Primary Examiner* — William C Vaughn, Jr.
*Assistant Examiner* — Jerry Jean Baptiste
(74) *Attorney, Agent, or Firm* — Birch, Stewart, Kolasch & Birch, LLP

(57) ABSTRACT

A parallel processing starting unit 3 that partitions an inputted image into tiles each having a predetermined size, and distributes tiles obtained through the partitioning, and N tile encoding units 5-1 to 5-N each of that carries out a prediction difference encoding process on a tile distributed thereto by the parallel processing starting unit 3 to generate
(Continued)

a local decoded image are disposed, and each of N tile loop filter units 7-1 to 7-N determines a filter per tile suitable for a filtering process on the local decoded image generated by the corresponding one of the tile encoding units 5-1 to 5-N, and carries out the filtering process on the local decoded image by using the filter.

1 Claim, 19 Drawing Sheets

(51) Int. Cl.
*H04N 19/176* (2014.01)
*H04N 19/46* (2014.01)
*H04N 19/117* (2014.01)
*H04N 19/82* (2014.01)
*H04N 19/436* (2014.01)
*H04N 19/172* (2014.01)
*H04N 19/174* (2014.01)
*H04N 19/159* (2014.01)

(52) U.S. Cl.
CPC ......... *H04N 19/174* (2014.11); *H04N 19/176* (2014.11); *H04N 19/436* (2014.11); *H04N 19/46* (2014.11); *H04N 19/82* (2014.11); *H04N 19/86* (2014.11); *H04N 19/159* (2014.11)

(56) References Cited

U.S. PATENT DOCUMENTS

| | | | | |
|---|---|---|---|---|
| 2009/0274216 | A1* | 11/2009 | Kato | H04N 19/147 375/240.16 |
| 2010/0118945 | A1* | 5/2010 | Wada | H04N 19/176 375/240.12 |
| 2012/0121188 | A1 | 5/2012 | Kenji | |
| 2013/0016771 | A1* | 1/2013 | Misra | H04N 19/176 375/240.03 |
| 2013/0094568 | A1* | 4/2013 | Hsu | H04N 19/82 375/240.02 |
| 2013/0301942 | A1 | 11/2013 | Kondo | |
| 2014/0270559 | A1 | 9/2014 | Kondo | |

FOREIGN PATENT DOCUMENTS

| | | |
|---|---|---|
| WO | WO 2013/008942 A1 | 1/2013 |
| WO | WO 2013/063455 A1 | 5/2013 |

OTHER PUBLICATIONS

Fuldseth, et al., "Tiles", Joint Collaborative Team on Video Coding (JCT-VC) of ITU-T SG16 WP3 and ISO/IEC JTC1/SC29/WG11, JCTVC-F335, 6th Meeting: Torino, IT, Jul. 14-22, 2011, pp. 1-15.
Fuldseth, et al., "Tiles", Joint Collaborative Team on Video Coding (JCT-VC) of ITU-T SG16 WP3 and ISO/IEC JTC1/SC29/WG11, JCTVC-FI43_rl, 5th Meeting: Geneva, CH, Mar. 16-23, 2011, pp. 1-14.
Yamakage, et al. "CE12: Deblocking Filter Parameter Adjustment in Slice Level", Joint Collaborative Team on Video Coding (JCT-VC) of ITU-T SG16 WP3 and ISO/IEC JTC1/SC29/WG11 6th Meeting: Torino, JCTVC-F143_rl, Jul. 14-22, 2011, pp. 1-4.
Joint Collaborative Team on Video Coding (JCT-VC): Title: CE4 Subset 3: Slice Common Information Sharing; Document: JCTVC-E045.
Joint Collaborative Team on Video Coding (JCT-VC); Title: Generalized slices: Document: JCTVC-Dxxx.
Joint Collaborative Team on Video Coding (JCT-VC); Title: Paralell Processing of ALF and SAO for Tiles; Document: JCTVC-G454.
Joint Collaborative Team on Video Coding (JCT-VC); Title: Slice Boundary Processing and Picture Layer Raw Byte Sequence Payload; Document: JCTVC-D128.
Joint Collaborative Team on Video Coding (JCT-VC); Title: Test Model Under Consideration; Document: JCTVC-B205.
Osamoto, "HM3.2 Fine Granularity Slice Implementation Issues to be Clarified," Joint Collaborative Team on Video Coding (JCT-VC) of ITU-T SG16 WP3 and ISO/IEC JTC1/SC29/WG11, JCTVC-F694m21177, 6th Meeting: Torino, IT, Jul. 14-22, 2011, pp. 1-5.
Kazui et al., "Support of very low delay coding in the Tile," Joint Collaborative Team on Video Coding (JCT-VC) of ITU-T SG16 WP3 and ISO/IEC JTC1/SC29/WG11, Document: JCTVC-F140, 6th Meeting, Torino, IT, Jul. 14-22, 2011 pp. 1-10.
Joint Collaborative Team on Video Coding (JCT-VC) of ITU-T SG16 WP3 and ISO/IEC JTC1/SC29/WG11 6th Meeting: Torino, IT, Jul. 14-22, 2011—JCTVC-F_Notes_d7—Title: Meeting report of the sixth meeting of the Joint Collaborative Team on Video Coding.
Joint Collaborative Team on Video Coding (JCT-VC) of ITU-T SG16 WP3 and ISO/IEC JTC1/SC29/WG11 7th Meeting: Geneva, CH, Nov. 21-30, 2011—JCTVC-G194—Title: AHG4: Non-cross-tiles loop filtering for independent tiles.

* cited by examiner

VIDEO DECODING DEVICE AND VIDEO DECODING METHOD

FIELD OF THE INVENTION

The present invention relates to a video decoding device for and a video decoding method of decoding encoded data transmitted thereto from a video encoding device into an image.

Conventionally, according to international standard video encoding methods, such as MPEG (Moving Picture Experts Group) and "ITU-T H.26x," an inputted video frame is partitioned into square blocks which are called macroblocks (MB), coding units (CU), or the like, and an intra-frame prediction, an inter-frame prediction, an orthogonal transformation of a prediction error signal, quantization, an entropy encoding process, and so on are carried out on each of the blocks. Further, after the processes on all the macroblocks are completed and one screenful of local decoded image is generated, a process of determining parameters for a loop filter, a process of filtering a local decoded image by using the loop filter, and an entropy encoding process are carried out.

The encoding process of encoding each coding unit is based on the premise that coding units are processed in a raster scan order, and in the encoding process on a certain coding unit, the encoded result of a previously-processed coding unit is needed in the raster scan order. Concretely, when carrying out an inter-frame prediction, a local decoded image of an adjacent coding unit is used as a reference to pixel. Further, in the entropy encoding process, a probability switching model is shared with the previously-processed coding unit in the raster scan order when the occurrence probability of a symbol is estimated, and it is necessary to refer to the mode information of an adjacent macroblock for switching between probability models. Therefore, in order to advance the encoding process on a certain coding unit, a part or all of the process on the previously-processed coding unit has to be completed in the raster scan order. This interdependence between coding units is an obstacle to the parallelization of the encoding process and a decoding process.

In the following nonpatent reference 1, a structural unit called a tile is used in order to solve the above-mentioned problem. In this specification, a tile is referred to as a rectangular region which consists of a plurality of coding units, as shown in FIG. 11. By eliminating the dependence on any coding unit belonging to a different tile, parallel processing on a tile level can be implemented. Concretely, a tile has characteristics as shown below.

(1) Partitioning of an image into tiles is carried out on a per coding unit basis.

(2) Partitioning of an image into tiles results in generation of a grid with the width of each row and that of each column being non-uniform. More specifically, tiles adjacent in a vertical direction have the same coordinates at both the right and left ends thereof, and tiles adjacent in a horizontal direction have the same coordinates at both the upper and lower ends thereof.

(3) Each coding unit is processed in a raster scan order which is closed within a tile. Further, slice partitioning can be carried out within a tile.

(4) In a coding unit which is processed first within a tile, entropy encoding is started from an initial state.

(5) In an intra-frame prediction process, an inter-frame prediction process, an entropy encoding process, and an entropy decoding process, at the time of making a reference to the local decoded image and the coding mode of an adjacent coding unit, a screen edge is processed without referring to the adjacent coding unit when the adjacent coding unit belongs to a different tile.

(6) A loop filtering process is carried out on the entire screen after the processes on all the tiles are completed and a decoded image of the entire screen is generated.

As mentioned above, in the encoding process of encoding a coding unit belonging to a certain tile, only the result of a coding unit belonging to the same tile is needed for orthogonal transformation, quantization, and entropy coding processes on a prediction signal and a prediction error signal. Therefore, the intra-frame/inter-frame prediction processes, and the orthogonal transformation, quantization, and entropy coding processes on the prediction error signal, which are included in the encoding process, can be carried out in parallel on a tile level. Further, in the decoding process on a bitstream generated using tiles, an entropy decoding process, an inverse quantization and inverse transformation process on a prediction error signal, and intra-frame/inter-frame prediction processes can be carried out in parallel on a tile level.

RELATED ART DOCUMENT

Nonpatent Reference

Nonpatent reference 1: Arild Fuldseth, Michael Horowitz, Shilin Xu, Andrew Segall, Minhua Zhou, "JCTVC-F335: Tiles", Joint Collaborative Team on Video Coding (JCT-VC) of ITU-T SG16WP3 and ISO/IEC JTC1/SC29/WG11 6th Meeting: Torino, IT, 14-22 Jul. 2011

SUMMARY OF THE INVENTION

Problems to be Solved by the Invention

Because conventional video encoding devices are constructed as above, while the intra-frame/inter-frame prediction processes, and the orthogonal transformation, quantization, and entropy encoding processes on the prediction error signal can be carried out in parallel, the loop filtering process is carried out on the entire screen. In this case, because it is necessary to refer to the local decoded images of both tiles adjacent to a tile boundary when performing a filtering process on the tile boundary, a problem is that the processes on both the tiles must be completed and parallel processing cannot be carried out on a tile level.

The present invention is made in order to solve the above-mentioned problem, and it is therefore an object of the present invention to provide a video decoding device and a video decoding method capable of carrying out a loop filtering process in parallel on a tile level.

Means for Solving the Problem

In accordance with the present invention, there is provided a video decoding device including: an encoded bit data distributor that separates encoded bit data separated from a bitstream into encoded bit data per tile; one or more tile decoders each of that carries out a prediction difference decoding process on encoded bit data per tile separated by the encoded bit data distributor to generate a decoded image per tile; and one or more tile filters each of that carries out a filtering process on the decoded image generated by one of the one or more tile decoders by using a filter per tile shown by a filter parameter separated from the bitstream.

Advantages of the Invention

Because the video decoding device in accordance with the present invention is constructed in such a way as to include the encoded bit data distributor that separates encoded bit data separated from a bitstream into encoded bit data per tile; the one or more tile decoders each of that carries out a prediction difference decoding process on encoded bit data per tile separated by the encoded bit data distributor to generate a decoded image per tile; and the one or more tile filters each of that carries out a filtering process on the decoded image generated by one of the one or more tile decoders by using a filter per tile shown by a filter parameter separated from the bitstream, there is provided an advantage of enabling the loop filters to carry out the filtering processes in parallel on a tile level.

EMBODIMENTS OF THE INVENTION

Hereafter, in order to explain this invention in greater detail, the preferred embodiments of the present invention will be described with reference to the accompanying drawings.

Embodiment 1

Figure 1:
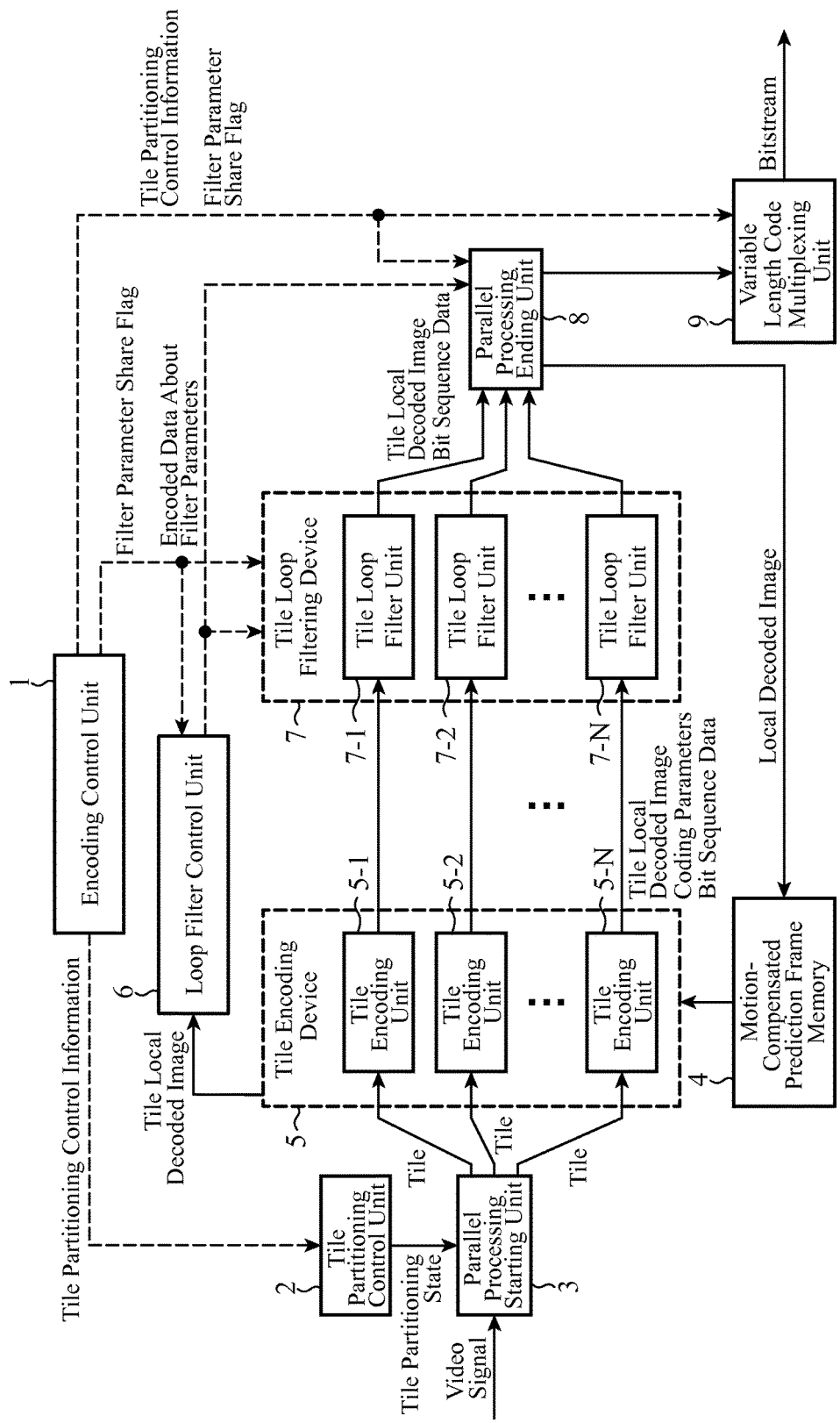
FIG. 1 is a block diagram showing a video encoding device in accordance with Embodiment 1 of the present invention.

FIG. 1 is a block diagram showing a video encoding device in accordance with Embodiment 1 of the present invention. Referring to FIG. 1, an encoding control unit 1 carries out a process of outputting tile partitioning control information (partitioning control information) indicating a dividing state at the time of partitioning an inputted image shown by a video signal into tiles each of which is a rectangular region having a predetermined size. The encoding control unit 1 also carries out a process of outputting a filter parameter share flag (filter share flag) showing whether or not a filter for use in a filtering process to be performed on a local decoded image per tile, which is generated by each of tile encoding units 5-1 to 5-N, is made to be shared among the tiles. The encoding control unit 1 constructs a partitioning controller.

A tile partitioning control unit 2 carries out a process of controlling the partitioning of the inputted image by a parallel processing starting unit 3 in such a way that the partitioning matches the partitioning state indicated by the tile partitioning control information outputted from the encoding control unit 1. The parallel processing starting unit 3 carries out a process of partitioning the inputted image shown by the video signal into tiles each having a predetermined size according to a command from the tile partitioning control unit 2, and distributing the tiles obtained through the partitioning among the tile encoding units 5-1 to 5-N. A tile distributor is comprised of the tile partitioning control unit 2 and the parallel processing starting unit 3.

A motion-compensated prediction frame memory 4 is a recording medium for storing a local decoded image on which a filtering process is performed. The motion-compensated prediction frame memory 4 constructs an image memory. A tile encoding device 5 is equipped with the N tile encoding units 5-1 to 5-N, and each of the N tile encoding units 5-1 to 5-N carries out a prediction difference encoding process independently. N is an integer equal to or larger than 1. Each of the tile encoding units 5-1 to 5-N carries out a process of carrying out a prediction difference encoding process on each tile distributed thereto by the parallel processing starting unit 3 by referring to a local decoded image which is stored in the motion-compensated prediction frame memory 4 and on which a filtering process is performed, thereby outputting bit sequence data (encoded bit data) which is the result of the encoding process, and coding parameters (these coding parameters are used when carrying out the prediction difference encoding process, and include a coding mode, a prediction difference coding parameter, an intra prediction parameter, and an inter prediction parameter), and also generating a tile local decoded image (local decoded image). The tile encoding units 5-1 to 5-N construct tile encoders.

A loop filter control unit 6 carries out a process of, when the filter parameter share flag outputted from the encoding control unit 1 shows that a filter is made to be shared among the tiles, obtaining a local decoded image per frame from the tile local decoded images generated by the tile encoding units 5-1 to 5-N, determining a filter per frame suitable for the local decoded image per frame, and outputting filter parameters showing the filter to a tile loop filtering device 7. The loop filter control unit 6 also carries out a process of variable-length-encoding the filter parameters showing the filter per frame, and outputting encoded data about the filter parameters to a parallel processing ending unit 8. The loop filter control unit 6 constructs a per-frame filter determinator.

The tile loop filtering device 7 is equipped with N tile loop filter units 7-1 to 7-N, and each of the N tile loop filter units 7-1 to 7-N carries out a filtering process independently. N is an integer equal to or larger than 1. Each of the tile loop filter units 7-1 to 7-N carries out a process of, when the filter parameter share flag outputted from the encoding control unit 1 shows that a filter is made not to be shared among the tiles, determining a filter per tile suitable for a filtering process to be performed on the tile local decoded image generated by the corresponding one of the tile encoding units 5-1 to 5-N and performing the filtering process on the tile local decoded image by using the filter, and also variable-length-encoding the filter parameters showing the filter per tile and multiplexing encoded data about the filter parameters into the bit sequence data outputted from the corresponding one of the tile encoding units 5-1 to 5-N. In contrast, when the filter parameter share flag shows that a filter is made to be shared among the tiles, each of the tile loop filter units carries out a process of performing a filtering process on the tile local decoded image generated by the corresponding one of the tile encoding units 5-1 to 5-N by using the filter per frame shown by the filter parameters outputted from the loop filter control unit 6, and also outputting the bit sequence data outputted from the corresponding one of the tile encoding units 5-1 to 5-N, just as it is. The tile loop filter units 7-1 to 7-N construct tile filters.

The parallel processing ending unit 8 carries out a process of combining the tile local decoded images on which the filtering processes are respectively performed by the tile loop filter units 7-1 to 7-N to generate a local decoded image per frame according to the tile partitioning control information outputted from the encoding control unit 1, and storing the local decoded image in the motion-compensated prediction frame memory 4, and also outputting the bit sequence data outputted from each of the tile loop filter units 7-1 to 7-N to a variable length code multiplexing unit 9. The parallel processing ending unit 8 also carries out a process of, when the filter parameter share flag outputted from the encoding control unit 1 that a filter is made to be shared among the tiles, outputting the encoded data about the filter parameters showing the filter per frame outputted from the loop filter control unit 6 to the variable length code multiplexing unit 9. The parallel processing ending unit 8 constructs a local decoded image storage.

The variable length code multiplexing unit 9 carries out a process of, when the filter parameter share flag outputted from the encoding control unit 1 shows that a filter is made not to be shared among the tiles, multiplexing the bit sequence data outputted from the parallel processing ending unit 8, and the tile partitioning control information and the filter parameter share flag which are outputted from the encoding control unit 1 to generate a bitstream. In contrast, when the filter parameter share flag shows that a filter is made to be shared among the tiles, the variable length code multiplexing unit carries out a process of multiplexing the bit sequence data and the encoded data about the filter parameters showing the filter per frame which are outputted from the parallel processing ending unit 8, and the tile partitioning control information and the filter parameter share flag which are outputted from the encoding control unit 1 to generate a bitstream. The variable length code multiplexing unit 9 constructs a multiplexer.

Figure 2:
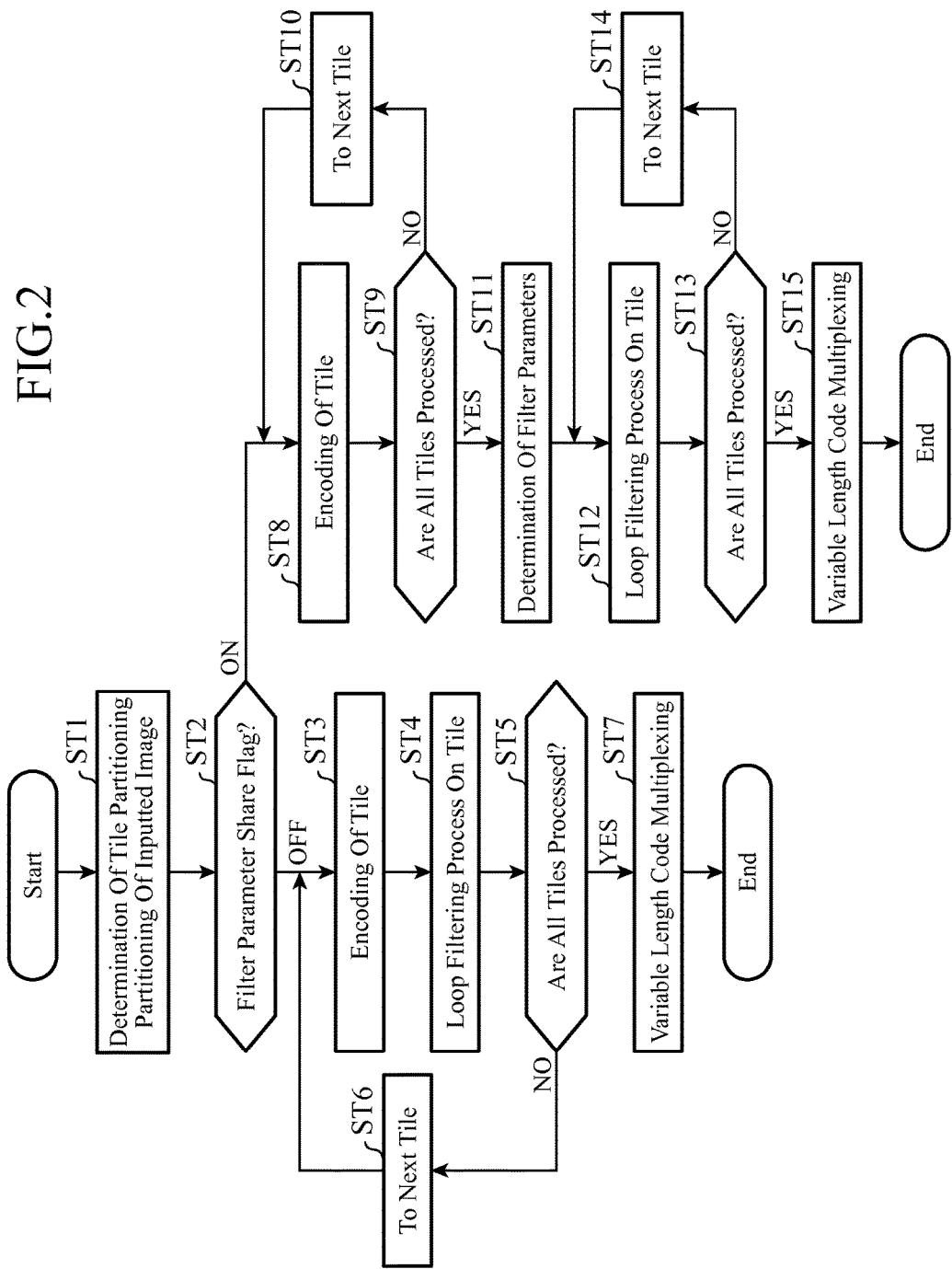
FIG. 2 is a flow chart showing processing (video encoding method) carried out by the video encoding device in accordance with Embodiment 1 of the present invention.

In the example shown in FIG. 1, it is assumed that each of the encoding control unit 1, the tile partitioning control unit 2, the parallel processing starting unit 3, the motion-compensated prediction frame memory 4, the tile encoding device 5, the loop filter control unit 6, the tile loop filtering device 7, the parallel processing ending unit 8, and the variable length code multiplexing unit 9, which are the components of the video encoding device, consists of dedicated hardware (e.g., a semiconductor integrated circuit equipped with a CPU, a one chip microcomputer, or the like). In a case in which the video encoding device consists of a computer, a program in which the processes carried out by the encoding control unit 1, the tile partitioning control unit 2, the parallel processing starting unit 3, the tile encoding device 5, the loop filter control unit 6, the tile loop filtering device 7, the parallel processing ending unit 8, and the variable length code multiplexing unit 9 are described can be stored in a memory of the computer, and a CPU of the computer can be made to execute the program stored in the memory. FIG. 2 is a flow chart showing processing (a video encoding method) carried out by the video encoding device in accordance with Embodiment 1 of the present invention.

Figure 3:
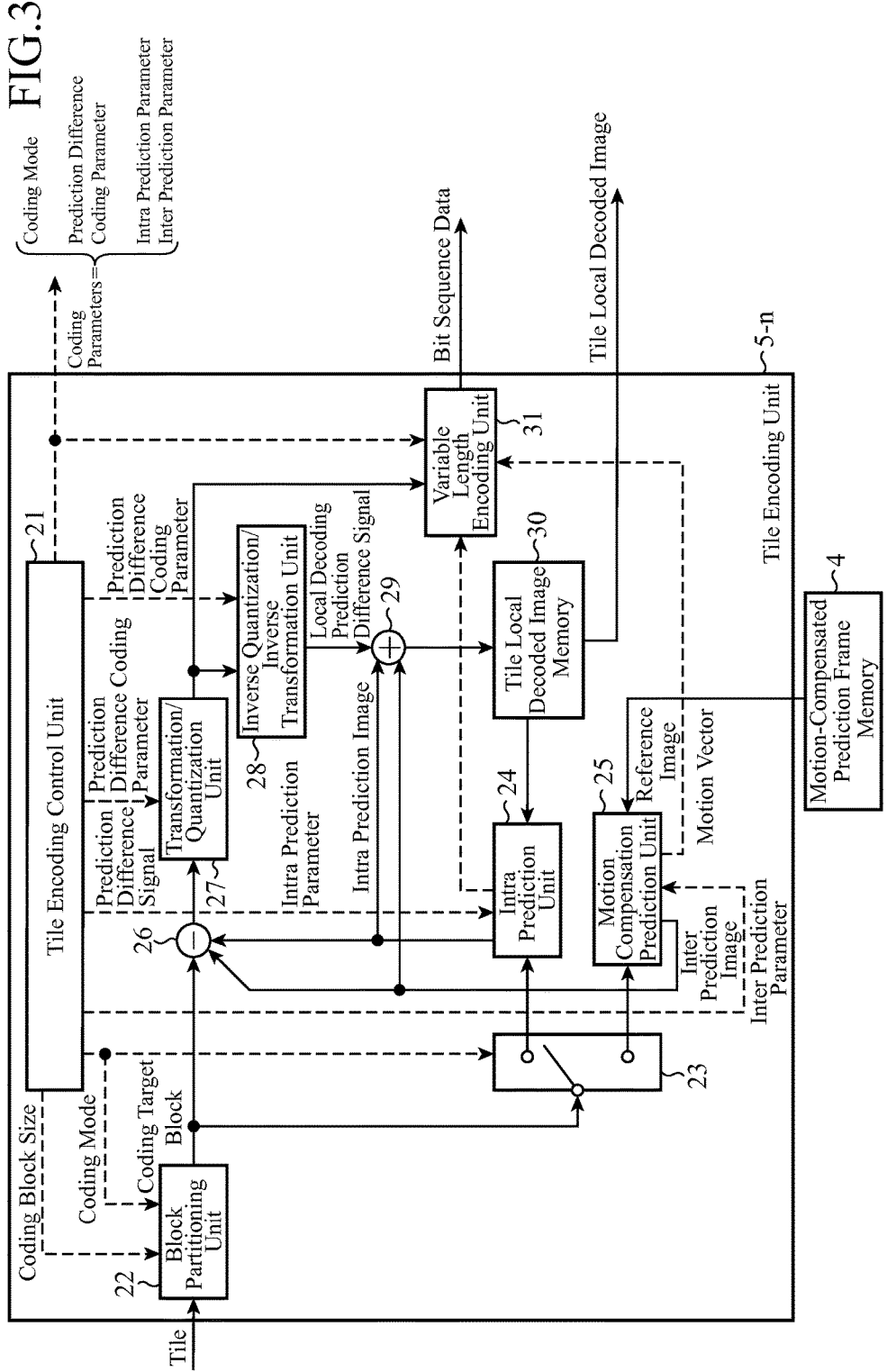
FIG. 3 is a block diagram showing each tile encoding unit 5-$n$ ($n$=1, 2, . . . , N) of the video encoding device in accordance with Embodiment 1 of the present invention.

FIG. 3 is a block diagram showing each tile encoding unit 5-$n$ (n=1, 2, . . . , N) of the video encoding device in accordance with Embodiment 1 of the present invention. Referring to FIG. 3, a tile encoding control unit 21 carries out a process of determining a coding block size which is the size of a coding target block, and also determining a coding mode with the highest coding efficiency for a coding target block outputted from a block partitioning unit 22 from among one or more selectable intra coding modes and one or more selectable inter coding modes. The tile encoding control unit 21 also carries out a process of, when the coding mode with the highest coding efficiency is an intra coding mode, determining an intra prediction parameter which is used when an intra prediction process is carried out on the coding target block in the intra coding mode and, when the coding mode with the highest coding efficiency is an inter coding mode, determining an inter prediction parameter which is used when an inter prediction process is carried out on the coding target block in the inter coding mode. The tile encoding control unit 21 further carries out a process of determining a prediction difference coding parameter to be provided for a transformation/quantization unit 27, an inverse quantization/inverse transformation unit 28, and a variable length encoding unit 31. Hereafter, the coding mode, the prediction difference coding parameter, and the intra prediction parameter or the inter prediction parameter, which are determined by the tile encoding control unit 21, are collectively referred to as the coding parameters. The tile encoding control unit 21 carries out a process of outputting the coding parameters to the tile loop filter unit 7-$n$ (n=1, 2, . . . , N).

The block partitioning unit 22 carries out a process of partitioning each tile distributed thereto by the parallel processing starting unit 3 into blocks (blocks each of which is a unit for prediction process) each having the coding block size determined by the tile encoding control unit 21, and outputting a coding target block which is a unit for prediction process. A select switch 23 carries out a process of, when the coding mode determined by the tile encoding control unit 21 is an intra coding mode, outputting the coding target block outputted thereto from the block partitioning unit 22 to an intra prediction unit 24, and, when the coding mode determined by the tile encoding control unit 21 is an inter coding mode, outputting the coding target block outputted thereto from the block partitioning unit 22 to a motion-compensated prediction unit 25.

The intra prediction unit 24 carries out a process of, while referring to a local decoded image stored in the tile local decoded image memory 30, performing an intra prediction process on the coding target block outputted from the select switch 23 by using the intra prediction parameter determined by the tile encoding control unit 21 to generate an intra prediction image. Because only the local decoded images of blocks belonging to the same tile are stored in the tile local decoded image memory 30, no reference is made to the local decoded image of any block belonging to a different tile in the intra prediction process by the intra prediction unit 24. When the block at the position referred to belongs to a different tile, an intra prediction process which does not have to refer to any pixel is carries out.

The motion-compensated prediction unit 25 carries out a process of comparing the coding target block outputted from the select switch 23 with the local decoded image which is stored in the motion-compensated prediction frame memory 4 and on which a filtering process is performed to search for a motion vector, and performing an inter prediction process (motion-compensated prediction process) on the coding target block by using both the motion vector and the inter prediction parameter determined by the tile encoding control unit 21 to generate an inter prediction image. A subtracting unit 26 carries out a process of subtracting the intra prediction image generated by the intra prediction unit 24 or the inter prediction image generated by the motion-compensated prediction unit 25 from the coding target block outputted from the block partitioning unit 22 to output a prediction difference signal (difference image) which is the result of the subtraction to the transformation/quantization unit 27.

The transformation/quantization unit 27 carries out a process of carrying out an orthogonal transformation process (e.g., a DCT (discrete cosine transform) or an orthogonal transformation process, such as a KL transform, in which bases are designed for a specific learning sequence in advance) on the prediction difference signal outputted from the subtracting unit 26 by referring to the prediction difference coding parameter determined by the tile encoding control unit 21 to calculate transform coefficients, and also quantizing the transform coefficients by referring to the prediction difference coding parameter and then outputting compressed data which are the transform coefficients quantized thereby (quantization coefficients of the difference image) to the inverse quantization/inverse transformation unit 28 and the variable length encoding unit 31.

The inverse quantization/inverse transformation unit 28 carries out a process of inverse-quantizing the compressed data outputted from the transformation/quantization unit 27 by referring to the prediction difference coding parameter determined by the tile encoding control unit 21, and also carrying out an inverse orthogonal transformation process on the transform coefficients which are the compressed data inverse-quantized thereby by referring to the prediction difference coding parameter to calculate a local decoded prediction difference signal corresponding to the prediction difference signal outputted from the subtracting unit 26. An adding unit 29 carries out a process of adding the local decoded prediction difference signal calculated by the inverse quantization/inverse transformation unit 28 and the intra prediction image generated by the intra prediction unit 24 or the inter prediction image generated by the motion-compensated prediction unit 25 to calculate a local decoded image corresponding to the coding target block outputted from the block partitioning unit 22.

Figure 4:
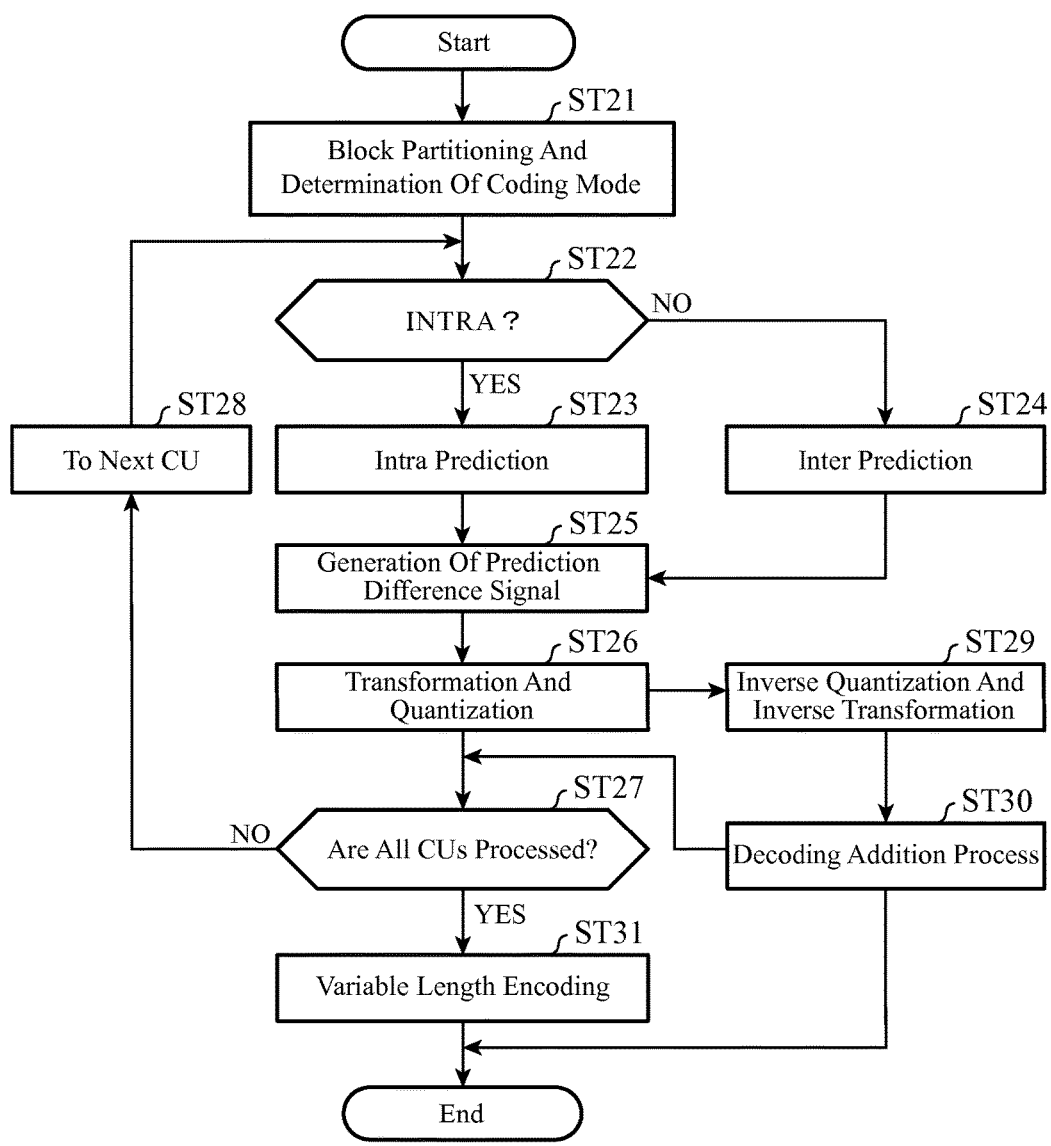
FIG. 4 is a flow chart showing a process carried out by each tile encoding unit 5-$n$ ($n$=1, 2, . . . , N) of the video encoding device in accordance with Embodiment 1 of the present invention.

The tile local decoded image memory 30 is a recording medium for storing the local decoded image calculated by the adding unit 29. When the encoding process on all the coding units (CUs) belonging to the tile is completed, the local decoded image about the single tile stored in the memory is outputted to the tile loop filter unit 7-$n$. The variable length encoding unit 31 carries out a process of variable-length-encoding the compressed data outputted from the transformation/quantization unit 27, the coding parameters outputted from the tile encoding control unit 21, and the motion vector outputted from the motion-compensated prediction unit 25 (when the coding mode is an inter coding mode), and outputting bit sequence data which are the results of the encoding to the tile loop filter unit 7-$n$. FIG. 4 is a flow chart showing a process carried out by each tile encoding unit 5-$n$ ($n=1, 2, \ldots , N$) of the video encoding device in accordance with Embodiment 1 of the present invention.

Figure 5:
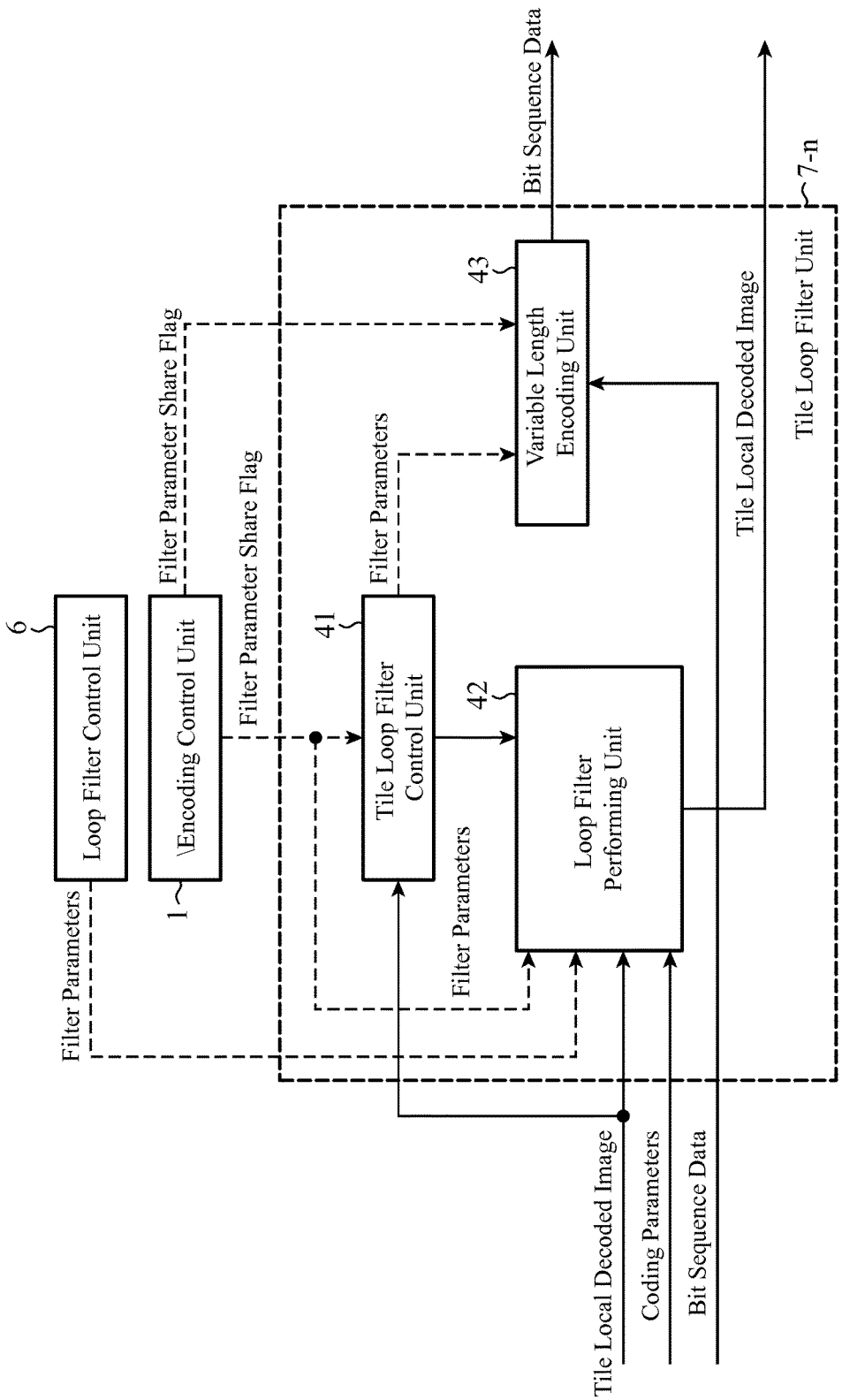
FIG. 5 is a block diagram showing each tile loop filter unit 7-$n$ ($n$=1, 2, . . . , N) of the video encoding device in accordance with Embodiment 1 of the present invention.

FIG. 5 is a block diagram showing each tile loop filter unit 7-$n$ ($n=1, 2, \ldots , N$) of the video encoding device in accordance with Embodiment 1 of the present invention. Referring to FIG. 5, a tile loop filter control unit 41 carries out a process of, when the filter parameter share flag outputted from the encoding control unit 1 shows that a filter is made not to be shared among the tiles, determining a filter per tile suitable for a filtering process to be performed on the tile local decoded image generated by the tile encoding unit 5-$n$, and outputting filter parameters showing the filter to a loop filter performing unit 42 and a variable length encoding unit 43.

The loop filter performing unit 42 carries out a filtering process on the tile local decoded image outputted from the tile encoding unit 5-$n$ by using both the filter per tile shown by the filter parameters outputted from the tile loop filter control unit 41, and the coding parameters outputted from the tile encoding unit 5-$n$ when the filter parameter share flag outputted from the encoding control unit 1 shows that a filter is made not to be shared among the tiles. In contrast, when the filter parameter share flag shows that a filter is made to be shared among the tiles, the loop filter performing unit carries out a filtering process on the tile local decoded image outputted from the tile encoding unit 5-$n$ by using both the filter per tile shown by the filter parameters outputted from the loop filter control unit 6, and the coding parameters outputted from the tile encoding unit 5-$n$.

The variable length encoding unit 43 carries out a process of variable-length-encoding the filter parameters showing the filter per tile, which is outputted from the tile loop filter control unit 41, multiplexing encoded data about the filter parameters into the bit sequence data outputted from the tile encoding unit 5-$n$, and outputting the bit sequence data to the parallel processing ending unit 8 when the filter parameter share flag outputted from the encoding control unit 1 shows that a filter is made not to be shared among the tiles. In contrast, when the filter parameter share flag shows that a filter is made to be shared among the tiles, the variable length encoding unit carries out a process of outputting the bit sequence data outputted from the tile encoding unit 5-*n* to the parallel processing ending unit 8, just as it is.

Figure 6:
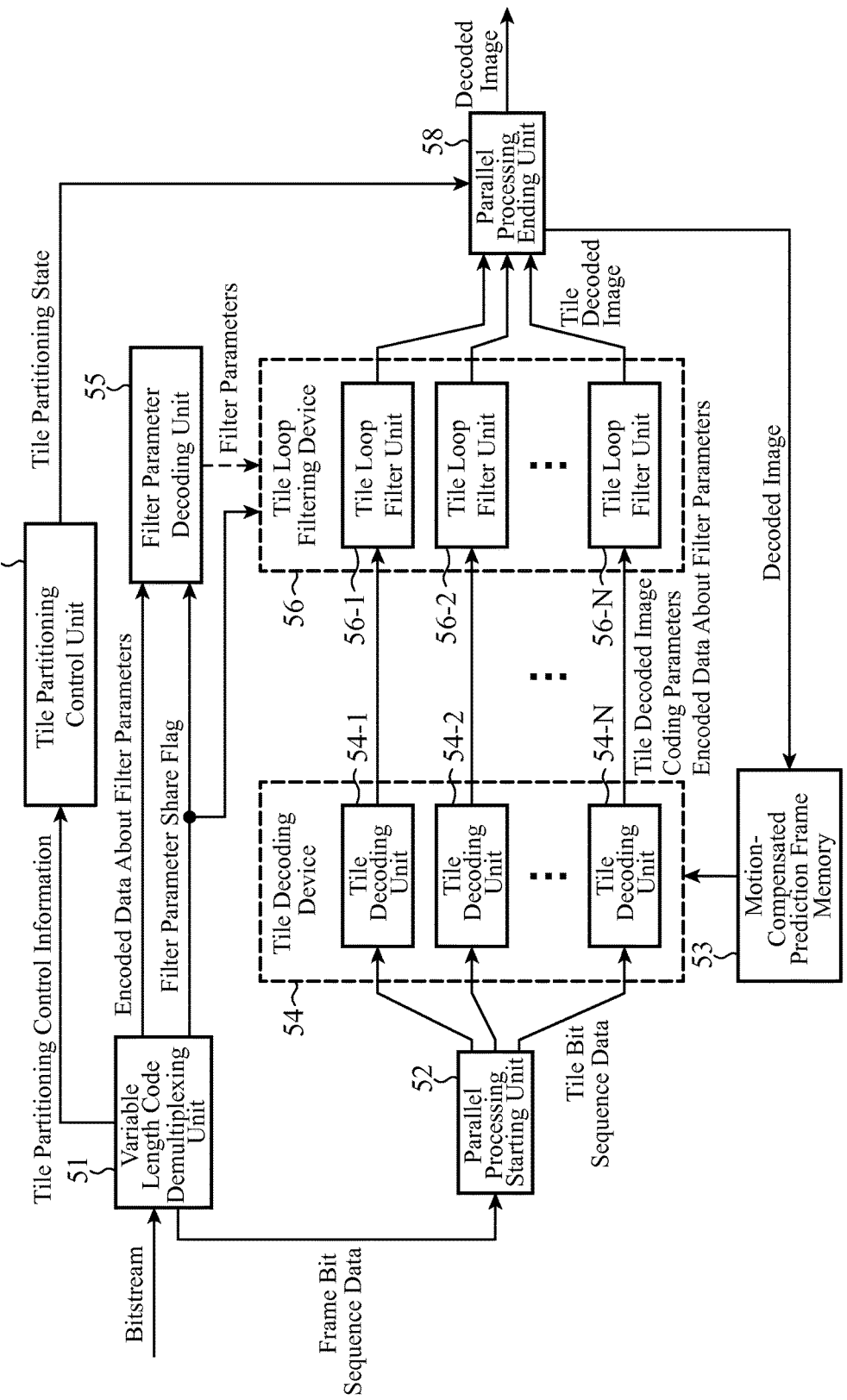
FIG. 6 is a block diagram showing a video decoding device in accordance with Embodiment 1 of the present invention.

FIG. 6 is a block diagram showing a video decoding device in accordance with Embodiment 1 of the present invention. Referring to FIG. 6, a variable length code demultiplexing unit 51 carries out a process of, when receiving the bitstream generated by the video encoding device shown in FIG. 1, demultiplexing the bitstream into the bit sequence data per frame (data in which the bit sequence data per tile are united), the tile partitioning control information indicating the partitioning state of the inputted image, the filter share flag showing whether or not a filter is made to be shared among the tiles, and the encoded data about the filter parameters showing a filter per frame (when the filter parameter share flag shows that a filter is made to be shared among the tiles), which are multiplexed into the bitstream. The variable length code demultiplexing unit 51 constructs a demultiplexer.

A parallel processing starting unit 52 carries out a process of dividing the bit sequence data per frame outputted from the variable length code demultiplexing unit 51 into a plurality of bit sequence data per tile, and distributing the bit sequence data per tile among tile decoding units 54-1 to 54-N. The parallel processing starting unit 52 constructs an encoded bit data distributor. A motion-compensated prediction frame memory 53 is a recording medium for storing a decoded image on which a filtering process is performed. The motion-compensated prediction frame memory 53 constructs an image memory.

A tile decoding device 54 is equipped with the N tile decoding units 54-1 to 54-N, and each of the N tile decoding units 54-1 to 54-N carries out a prediction difference decoding process independently. N is an integer equal to or larger than 1. Each of the tile decoding units 54-1 to 54-N carries out a process of carrying out a prediction difference decoding process on bit sequence data per tile distributed thereto by the parallel processing starting unit 52 by referring to a decoded image which is stored in the motion-compensated prediction frame memory 53 and on which a filtering process is performed, thereby generating a tile decoded image (decoded image per tile), and also outputting coding parameters which the tile decoding unit uses when carrying out the prediction difference decoding process (coding parameters multiplexed into the bit sequence data) to the corresponding one of tile loop filter units 56-1 to 56-N. Each of the tile decoding units also carries out a process of, when the encoded data about the filter parameters showing a filter per tile is multiplexed into the bit sequence data, outputting the encoded data about the filter parameters to the corresponding one of the tile loop filter units 56-1 to 56-N. The tile decoding units 54-1 to 54-N construct tile decoders.

A filter parameter decoding unit 55 carries out a process of, when the filter parameter share flag separated by the variable length code demultiplexing unit 51 shows that a filter is made to be shared among the tiles, decoding the encoded data outputted thereto from the variable length code demultiplexing unit 51 into the filter parameters showing the filter per frame, and outputs the filter parameters to the tile loop filter units 56-1 to 56-N.

A tile loop filtering device 56 is equipped with the N tile loop filter units 56-1 to 56-N, and each of the N tile loop filter units 56-1 to 56-N carries out a filtering process independently. N is an integer equal to or larger than 1. Each of the tile loop filter units 56-1 to 56-N carries out a process of, when the filter parameter share flag separated by the variable length code demultiplexing unit 51 shows that a filter is made not to be shared among the tiles, decodes the encoded data outputted from the corresponding one of the tile decoding units 54-1 to 54-N into the filter parameters showing a filter per tile, and performing a filtering process on the tile decoded image generated by the corresponding one of the tile decoding units 54-1 to 54-N by using the filter per tile shown by the filter parameter. In contrast, when the filter parameter share flag shows that a filter is made to be shared among the tiles, each of the tile loop filter units carries out a process of performing a filtering process on the tile decoded image generated by the corresponding one of the tile decoding units 54-1 to 54-N by using the filter per frame shown by the filter parameters outputted from the filter parameter decoding unit 55. The tile loop filter units 56-1 to 56-N construct tile filters.

A tile partitioning control unit 57 carries out a process of grasping the partitioning state of the tiles from the tile partitioning control information separated by the variable length code demultiplexing unit 51 and controlling the arrangement of each tile decoded image in a parallel processing ending unit 58 in such a way that a decoded image corresponding to the original inputted image is obtained. The parallel processing ending unit 58 carries out a process of combining the tile decoded images on which the filtering process are respectively performed by the tile loop filter units 56-1 to 56-N to generate a decoded image per frame under the control of the tile partitioning control unit 57, and storing the decoded image in the motion-compensated prediction frame memory 53. A decoded image storage is comprised of the tile partitioning control unit 57 and the parallel processing ending unit 58.

Figure 7:
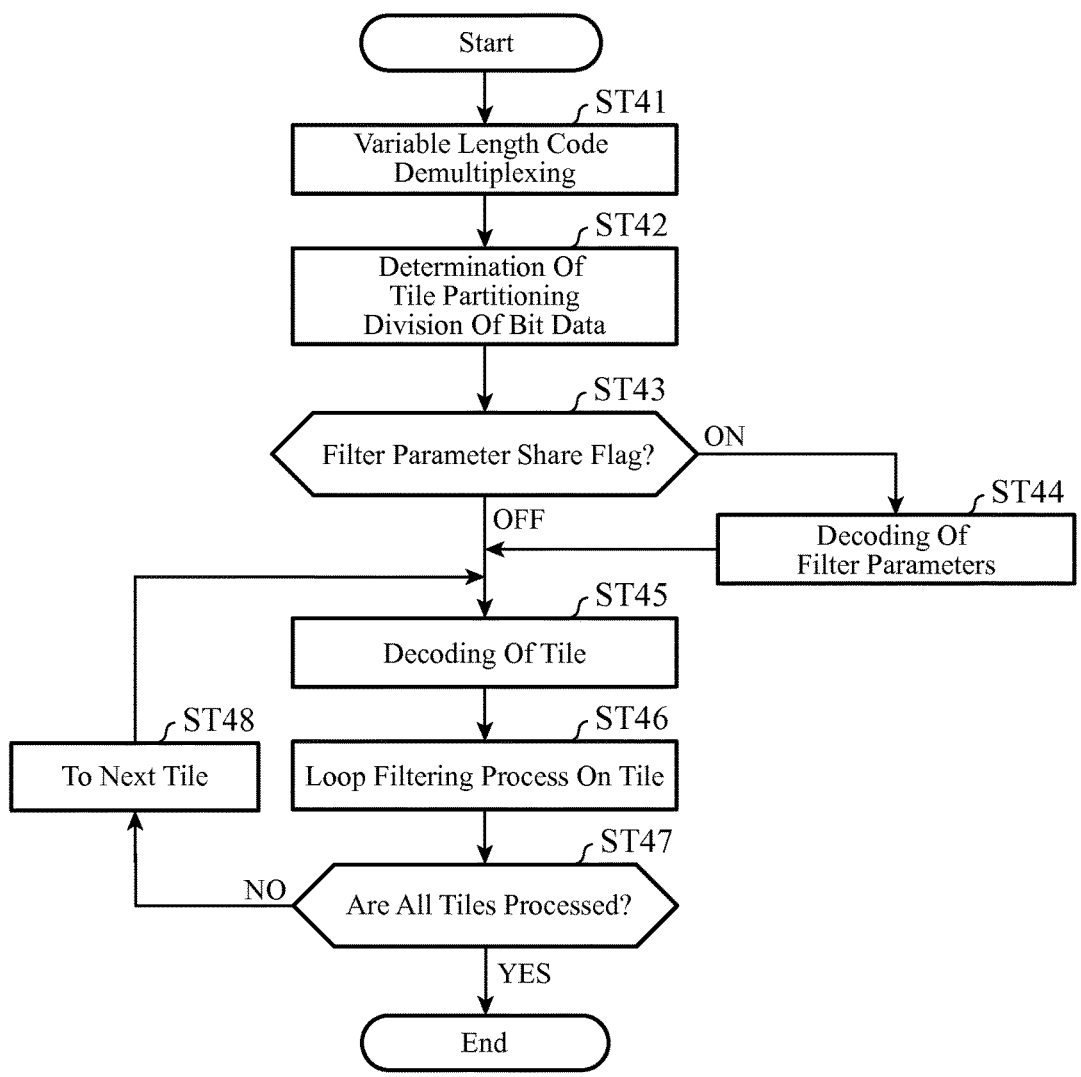
FIG. 7 is a flow chart showing processing (video decoding method) carried out by the video decoding device in accordance with Embodiment 1 of the present invention.

In the example shown in FIG. 6, it is assumed that each of the variable length code demultiplexing unit 51, the parallel processing starting unit 52, the motion-compensated prediction frame memory 53, the tile decoding device 54, the filter parameter decoding unit 55, the tile loop filtering device 56, the tile partitioning control unit 57, and the parallel processing ending unit 58, which are the components of the video decoding device, consists of dedicated hardware (e.g., a semiconductor integrated circuit equipped with a CPU, a one chip microcomputer, or the like). In a case in which the video decoding device consists of a computer, a program in which the processes carried out by the variable length code demultiplexing unit 51, the parallel processing starting unit 52, the tile decoding device 54, the filter parameter decoding unit 55, the tile loop filtering device 56, the tile partitioning control unit 57, and the parallel processing ending unit 58 are described can be stored in a memory of the computer, and a CPU of the computer can be made to execute the program stored in the memory. FIG. 7 is a flow chart showing processing (video decoding method) carried out by the video decoding device in accordance with Embodiment 1 of the present invention.

Figure 8:
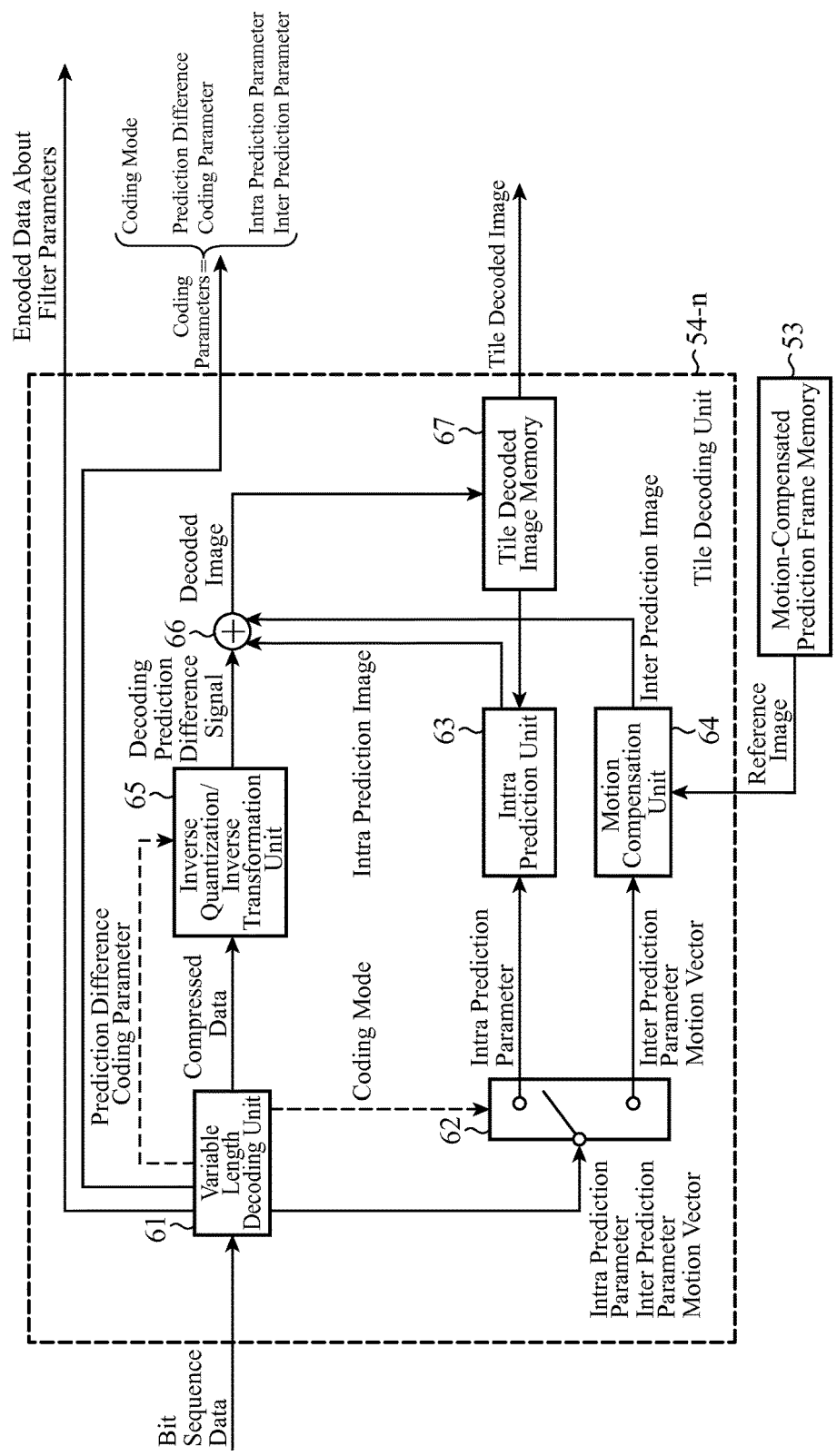
FIG. 8 is a block diagram showing each tile decoding unit 54-$n$ ($n$=1, 2, . . . , N) of the video decoding device in accordance with Embodiment 1 of the present invention.

FIG. 8 is a block diagram showing each tile decoding unit 54-*n* (n=1, 2, . . . , N) of the video encoding method in accordance with Embodiment 1 of the present invention. Referring to FIG. 8, a variable length decoder 61 carries out a process of variable-length-decoding the compressed data associated with a decoding target block (a block corresponding to a coding target block) which is a unit for prediction process, the coding parameters (the coding mode, the intra prediction parameter (when the coding mode is an intra coding mode), the inter prediction parameter (when the coding mode is an inter coding mode), and the prediction difference coding parameter), and the motion vector (when the coding mode is an inter coding mode) from bit sequence data per tile distributed thereto by the parallel processing starting unit 52, and outputting the coding parameters variable-length-decoded and the encoded data about the filter parameters showing the filter per tile which is multiplexed into the bit sequence data per tile to the tile loop filter unit 56-$n$.

A select switch 62 carries out a process of, when the coding mode variable-length-decoded by the variable length decoder 61 is an intra coding mode, outputting the intra prediction parameter variable-length-decoded by the variable length decoder 61 to an intra prediction unit 63, and, when the coding mode variable-length-decoded by the variable length decoder 61 is an inter coding mode, outputting the inter prediction parameter and the motion vector which are variable-length-decoded by the variable length decoder 61 to a motion compensator 64.

An intra prediction unit 63 carries out a process of performing an intra prediction process on the decoding target block by using the intra prediction parameter outputted from the select switch 62 while referring to a decoded image stored in a tile decoded image memory 67 to generate an intra prediction image. The motion compensator 64 carries out a process of performing an inter prediction process on the decoding target block by using the motion vector and the inter prediction parameter which are outputted from the select switch 62 while referring to a decoded image which is stored in the motion-compensated prediction frame memory 53 and on which a filtering process is performed to generate an inter prediction image.

Figure 9:
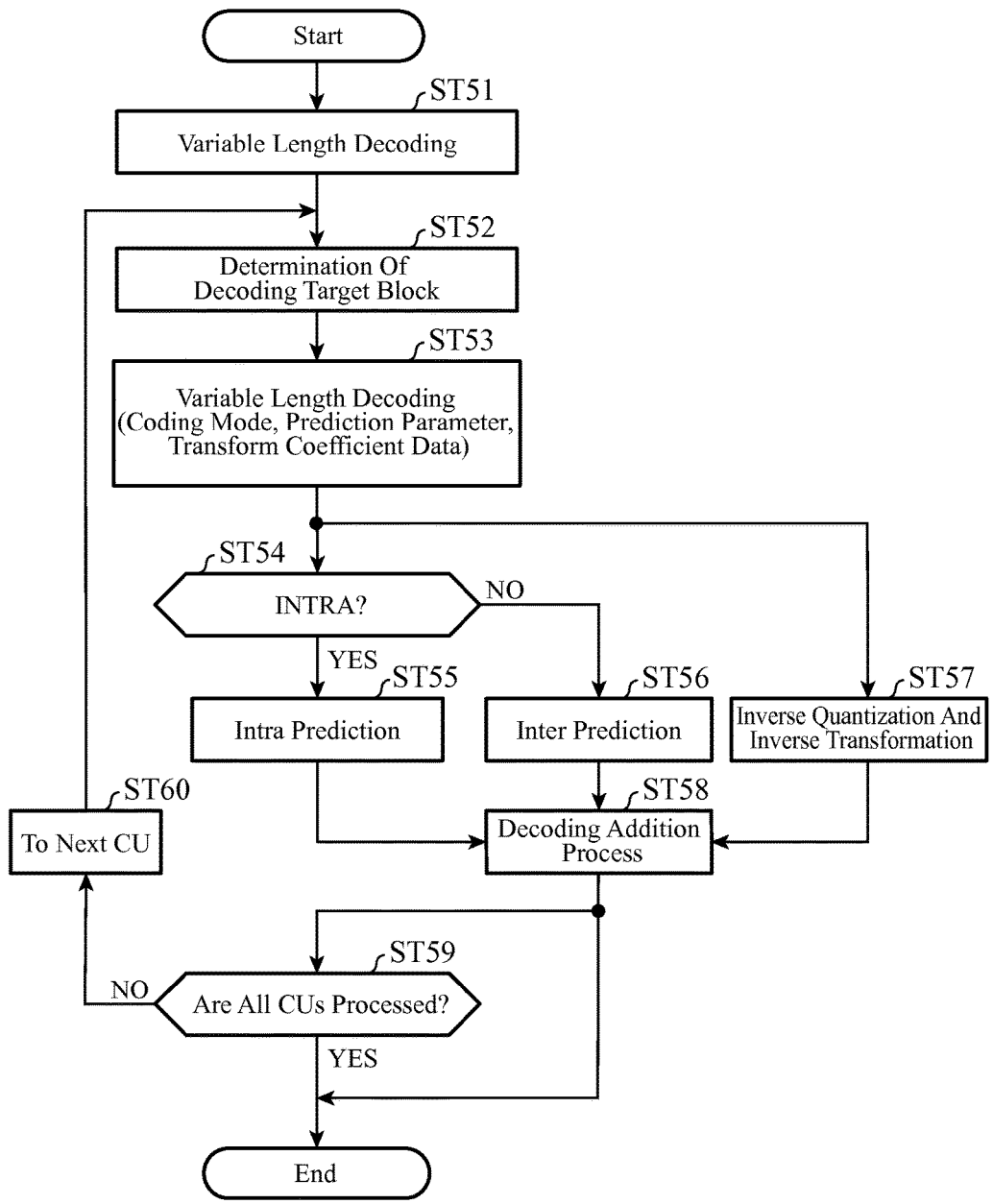
FIG. 9 is a flow chart showing a process carried out by each tile decoding unit 54-$n$ ($n$=1, 2, . . . , N) of the video decoding device is shown in accordance with Embodiment 1 of the present invention.

An inverse quantization/inverse transformation unit 65 carries out a process of referring to the prediction difference coding parameter variable-length-decoded by the variable length decoder 61 and inverse-quantizing the compressed data variable-length-decoded by the variable length decoder 61, and also referring to the prediction difference coding parameter and performing an inverse orthogonal transformation process on the transform coefficients which are the compressed data inverse-quantized to calculate a decoded prediction difference signal. An adding unit 66 carries out a process of adding the decoded prediction difference signal calculated by the inverse quantization/inverse transformation unit 65 and the intra prediction image generated by the intra prediction unit 63 or the inter prediction image generated by the motion compensator 64 to calculate a decoded image. The tile decoded image memory 67 is a recording medium for storing the decoded image calculated by the adding unit 66. When the decoding processing on all the coding units (CUs) belonging to the tile is completed, the decoded image about the single tile stored in the memory is outputted to the outside of each tile decoding unit 54-$n$. FIG. 9 is a flow chart showing the process carried out by each tile decoding unit 54-$n$ ($n=1, 2, \ldots, N$) of the video encoding method in accordance with Embodiment 1 of the present invention.

Figure 10:
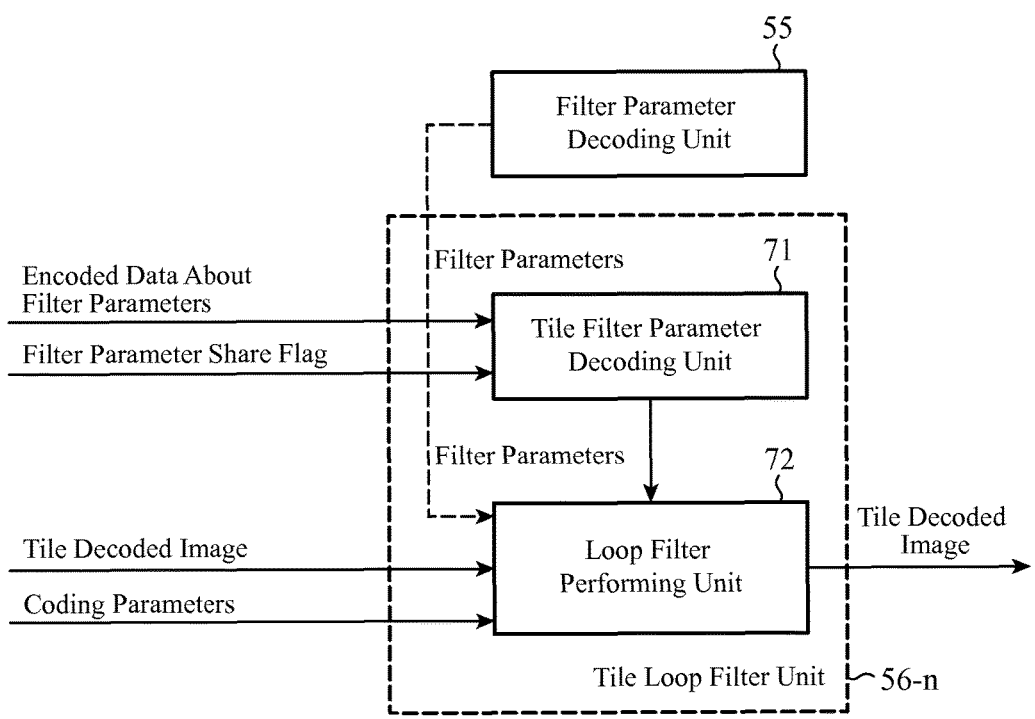
FIG. 10 is a block diagram showing each tile loop filter unit 56-$n$ ($n$=1, 2, . . . , N) of the video decoding device in accordance with Embodiment 1 of the present invention.

FIG. 10 is a block diagram showing each tile loop filter unit 56-$n$ ($n=1, 2, \ldots, N$) of the video encoding method in accordance with Embodiment 1 of the present invention. In FIG. 10, a tile filter parameter decoding unit 71 carries out a process of, when the filter parameter share flag separated by the variable length code demultiplexing unit 51 shows that a filter is made not to be shared among the tiles, decoding the encoded data about the filter parameters showing a filter per tile, the encoded data being separated by the variable length code demultiplexing unit 51, and outputting the filter parameters which are the result of the decoding to a loop filter performing unit 72.

The loop filter performing unit 72 carries out a filtering process on the tile decoded image outputted from the tile decoding unit 54-$n$ by using both the filter per tile shown by the filter parameters decoded by the tile filter parameter decoding unit 71 and the coding parameters variable-length-decoded by the variable length decoder 61 of the tile decoding unit 54-$n$ when the filter parameter share flag separated by the variable length code demultiplexing unit 51 shows that a filter is made not to be shared among the tiles. In contrast, when the filter parameter share flag shows that a filter is made to be shared among the tiles, the loop filter performing unit carries out a filtering process on the tile decoded image outputted from the tile decoding unit 54-$n$ by using both the filter per frame shown by the filter parameters outputted from the filter parameter decoding unit 55 and the coding parameters variable-length-decoded by the variable length decoder 61 of the tile decoding unit 54-$n$.

Next, operations will be explained. In this Embodiment 1, a case in which the video encoding device receives each frame image of a video as an inputted image, carries out a motion-compensated prediction between adjacent frames, and performs a compression process with an orthogonal transformation and quantization on an acquired prediction difference signal, and, after that, carries out variable length encoding to generate a bitstream, and the video decoding device decodes the bitstream outputted from the video encoding device will be explained.

First, the operation of the video encoding device shown in FIG. 1 will be explained. The video encoding device shown in FIG. 1 is characterized that the video encoding device partitions the inputted image into rectangular regions called tiles and eliminates the interdependence between encoding and decoding processes on tiles, thereby making it possible to carry out parallel processing on a tile level in the encoding processing. Simultaneously, the decoding processing is characterized in that an encoded result which makes it possible to perform parallel processing on a tile level is outputted.

In the encoding process on a video signal, the amount of information to be processed generally increases in proportion to the space resolution, the time resolution, and the luminance level resolution of the inputted image. There is a tendency for the time resolution, the space resolution, and the luminance level resolution of a video signal to increase with evolution of image capturing apparatus, storage apparatus, transmission apparatus, etc., and there is a possibility that it becomes impossible to carry out an encoding process and a decoding process at a predetermined speed in existing video encoding devices and existing video decoding devices. As one solution to this problematic situation, there can be considered a method of spatially partitioning the inputted image into parts and providing the parts for a plurality of encoding units respectively, and causing the plurality of encoding units to operate in parallel, thereby reducing the processing time. In this case, in also a decoding side, by providing a plurality of encoded data obtained through partitioning for different decoders respectively, and causing the plurality of decoders to carry out decoding processes in parallel, the processing time can be reduced.

In this case, in order to perform the parallel processing at a higher speed, it is desirable to reduce the frequency with which a reference to information is made among encoding units operating in parallel and the frequency with which a reference to information is made among decoders operating in parallel as much as possible. This reference includes a reference to a pixel for an intra-frame prediction, a reference to motion vector information for a motion vector prediction, and a reference to coding parameter information of an adjacent region for entropy encoding, and also includes a state of a symbol occurrence probability estimation model in entropy encoding. When a certain region is encoded, if adjacent regions are processed in parallel by other encoding units, synchronization among the processes is needed in order to refer to these pieces of information. Therefore, referring to the pieces of information is undesirable for improving the parallel performance. Further, in addition to the above-mentioned pieces of information, a pixel in an adjacent region needs to be referred to when carrying out a filtering process on a screen. Therefore, in order to improve the performance of the parallel processing including a filtering process, a pixel in an adjacent region currently being processed in parallel by another encoding unit or decoder should not be referred to also in the filtering process.

In this Embodiment 1, in order to implement a function required of such parallel processing for video encoding, the video encoding device is constructed in such a way as to partition the inputted image into rectangular regions called tiles, thereby enabling parallelization of a prediction difference encoding process on a tile level and also enabling parallelization of the determination of a filter coefficient and a filtering process, and to switch whether or not to parallelize the determination of a filter coefficient.

A video signal having a format which is to be processed by the video encoding device shown in FIG. 1 can be a YUV signal which consists of a luminance signal and two color difference signals or a color video signal in arbitrary color space, such as an RGB signal, outputted from a digital image sensor, or an arbitrary video signal, such as a monochrome image signal or an infrared image signal, in which each video frame consists of a series of digital samples (pixels) in two dimensions, horizontal and vertical. The gradation of each pixel can be a 8-bit, 10-bit, or 12-bit one. In the following explanation, for convenience sake, the video signal of the inputted image is a YUV signal unless otherwise specified. Further, a case in which signals having a 4:2:0 format which are subsampled are handled as the two color difference components U and V with respect to the luminance component Y will be described. Further, a data unit to be processed which corresponds to each frame of the video signal is referred to as a "picture." In this Embodiment 1, although an explanation will be made in which a "picture" is a video frame signal on which progressive scanning is carried out, a "picture" can be alternatively a field image signal which is a unit which constructs a video frame when the video signal is an interlaced signal.

First, the encoding control unit 1 outputs tile partitioning control information indicating a partitioning state at a time of partitioning an inputted image shown by a video signal into tiles each having a predetermined size to the tile partitioning control unit 2, the parallel processing ending unit 8, and the variable length code multiplexing unit 9. The encoding control unit 1 also outputs a filter parameter share flag showing whether a filter for use in a filtering process on a local decoded image per tile generated by each of the tile encoding units 5-1 to 5-N is made to be shared among the tiles (when a filter is made to be shared among the tiles, the flag is set to ON, otherwise, the flag is set to OFF) to the tile partitioning control unit 2, the loop filter control unit 6, the tile loop filter units 7-1 to 7-N, and the variable length code multiplexing unit 9.

When receiving the tile partitioning control information from the encoding control unit 1, the tile partitioning control unit 2 controls the partitioning of the inputted image by the parallel processing starting unit 3 in such a way that the partitioning state matches the partitioning state indicated by the tile partitioning control information. When the video signal showing the inputted image is inputted thereto, the parallel processing starting unit 3 partitions the inputted image into tiles each having the predetermined size according to a command from the tile partitioning control unit 2, and distributes the tiles obtained through the partitioning among the tile encoding units 5-1 to 5-N (step ST1 of FIG. 2). The information for controlling the tile partitioning can be expressed in various forms. For example, the tile partitioning can be specified by defining a CU (Largest CU: LCU) having a maximum size as a minimum unit of the tiles, and providing information showing how many LCUs are included.

Figure 11:
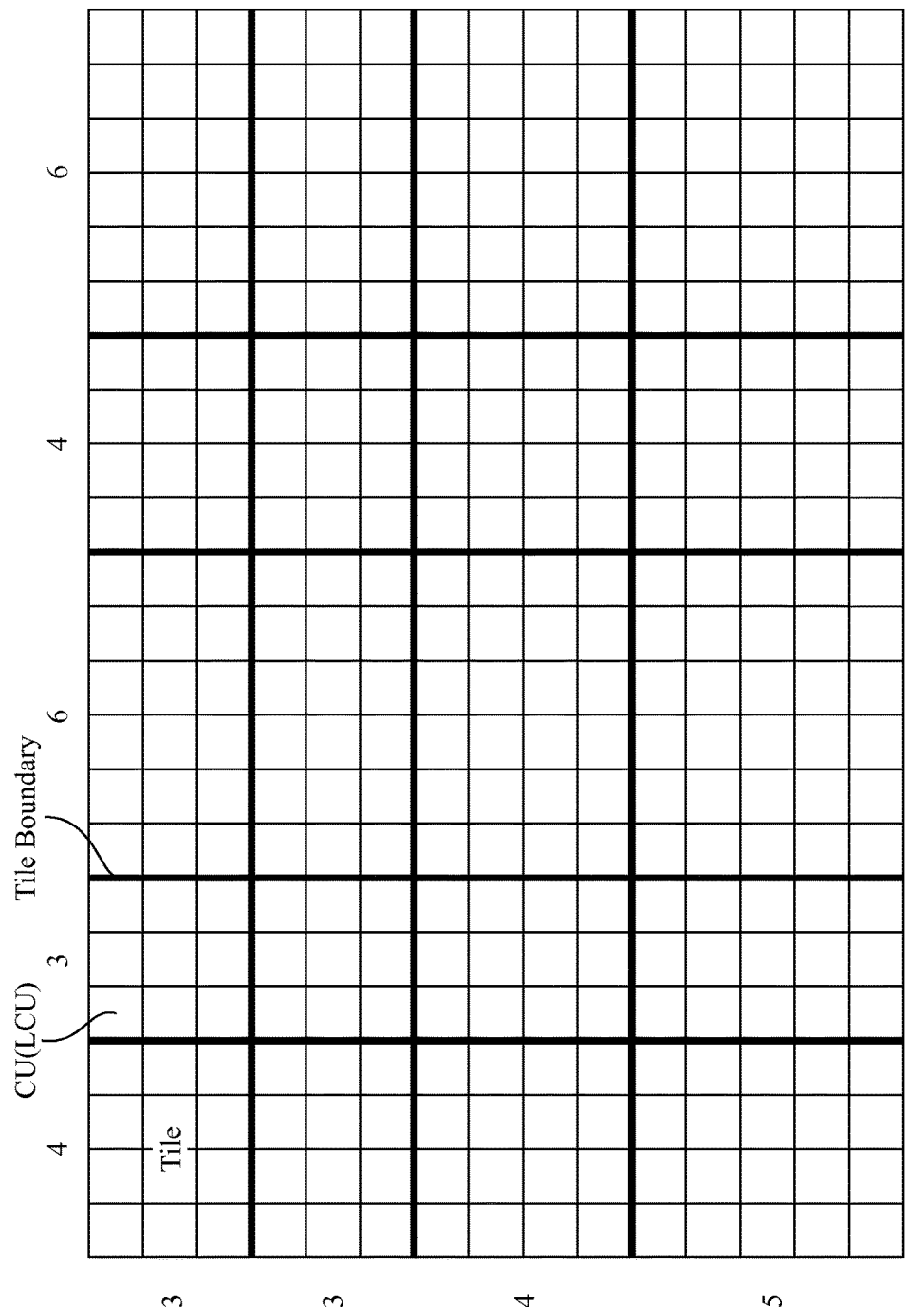
FIG. 11 is an explanatory drawing showing an example of partitioning of an image into LCUs and partitioning of an image into tiles.

FIG. 11 is an explanatory drawing showing an example of the LCU partitioning and the tile partitioning of an image. The inputted image is partitioned into LCUs arranged in a grid with an upper left corner being set as a start point, as shown in FIG. 11. When the height and the width of the image and the length of one side of each LCU are specified, this partitioning is determined uniquely. Because the tile partitioning is carried out with each LCU being defined as a minimum unit, the width and the height of each tile can be expressed by the number of LCUs included in the horizontal side and the number of LCUs included in the vertical side respectively. Therefore, ColumnWidthArray[ ] and RowHeightArray[ ] which are two integer series are provided as the tile partitioning control information. ColumnWidthArray[ ] is an integer series in which the widths of tiles arranged in a horizontal direction, each tile width being expressed by the number of LCUs, are listed in order starting with the width of the leftmost tile. RowHeightArray[ ] is an integer series in which the heights of files arranged in a vertical direction, each tile height being expressed by the number of LCUs, are listed in order starting with the height of the uppermost tile.

Figure 19:
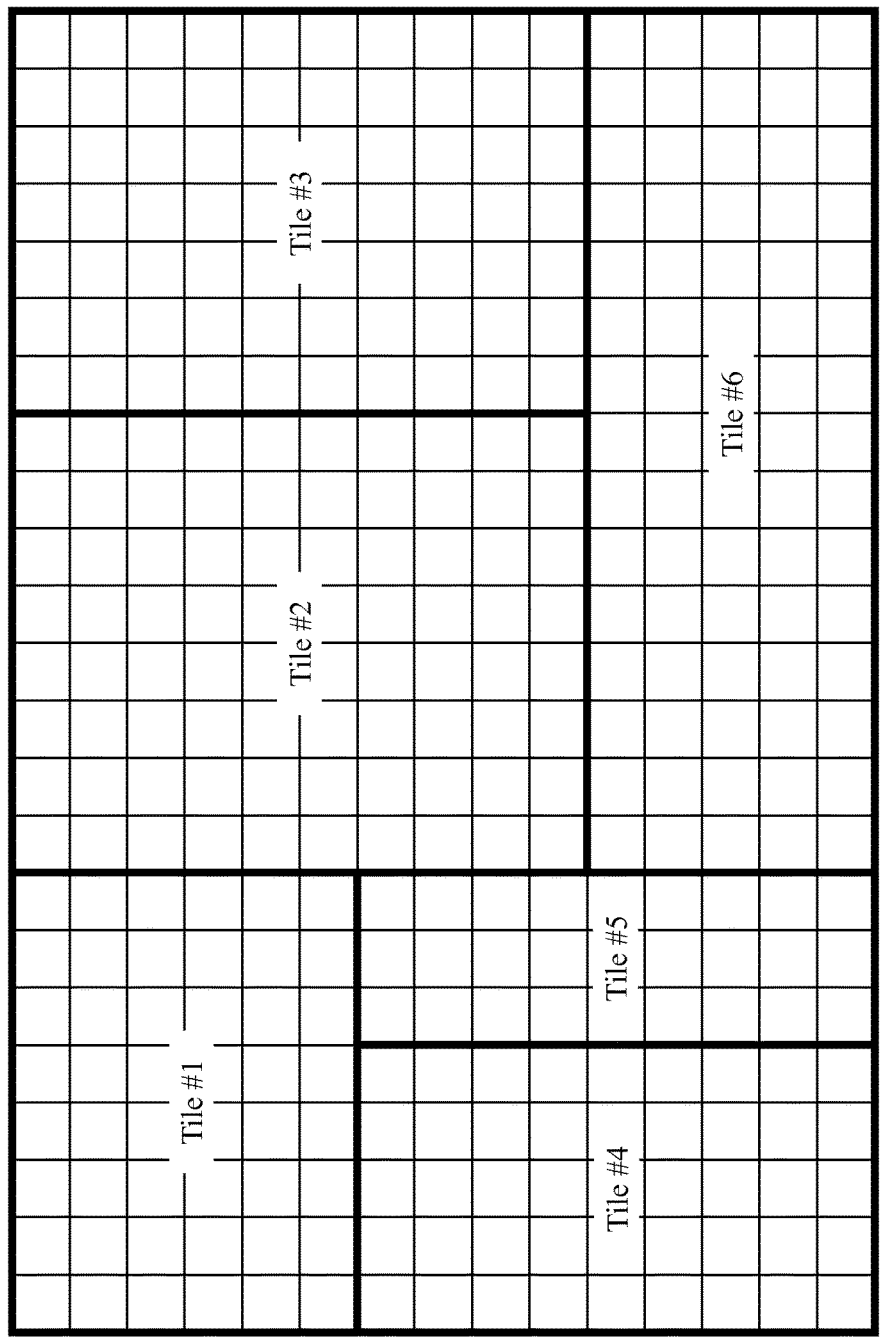
FIG. 19 is an explanatory drawing showing an example of freely partitioning into tiles not arranged in a grid.

For example, when the tile partitioning is specified as ColumnWidthArray[ ]={4, 3, 6, 4, 6} and RowHeightArray[ ]={3, 3, 4, 5}, the tile partitioning is carried out as shown in FIG. 11. Further, because the LCU partitioning of the inputted image is determined uniquely from the image size and the length of one side of an LCU, even if the width of the rightmost column and the height of the lowermost row are not specified, the LCU partitioning can be determined uniquely from the information about the other rows and the other columns. Therefore, these pieces of information can be omitted. In that case, the tile partitioning can be simply specified as ColumnWidthArray[ ]={4, 3, 6, 4} and RowHeightArray[ ]={3, 3, 4}. Although the example of partitioning a frame into tiles arranged in a grid as shown in FIG. 11 is explained above, more flexible tile partitioning which provides an arrangement of tiles arranged in a pattern different from a grid one, as shown in FIG. 19, can be alternatively carried out. In such a case, the tile partitioning control information must also be information which can express such a partitioning state. For example, the tile partitioning control information can be expressed by the coordinates of the pixels or the LCUs at the upper left ends of the tiles, and the pieces of information about the widths and the heights of the tiles. Further, the tile partitioning state can be maintained at the same state throughout the entire sequence, or can be alternatively changed on a per frame basis or on a per picture, such as intra picture or inter picture, basis. When the same tile partitioning state is used throughout the entire sequence, the tile partitioning information should just be multiplexed into the header of the sequence. When the tile partitioning state is changed in the course of the sequence, the tile partitioning information should just be multiplexed into the picture header of a picture which is to be processed immediately after the tile partitioning state is changed.

The video encoding device shown in FIG. 1 can also perform an operation of not carrying out any parallel processing on all tile levels. In this case, the tile partitioning control information can be specified in such a way as to show that the number of tiles is one and the size of the tile matches the size of the inputted image, or all the parallel processing can be turned off according to a tile encoding parallel flag or a tile loop filter unit parallel flag. As an alternative, another flag can be multiplexed into the tile partitioning control information to change whether or not to perform the parallel processing according to the flag. Although a case of carrying out the parallel processing on a tile level will be explained hereafter, an operation in a case of not carrying out the parallel processing is equivalent to an operation in a case in which the entire frame is a single tile.

The parallel processing starting unit 3 partitions the inputted image into tiles each having the predetermined size and distributes the tiles obtained through the partitioning among the tile encoding units 5-1 to 5-N, as mentioned above. In this case, because the number of tile encoding units 5-1 to 5-N is an upper limit to the number of tiles which can be simultaneously processed in parallel, two or more tiles can be outputted to each tile encoding unit 5-n when the number of tiles is larger than the number of tile encoding units 5-1 to 5-N. For example, when the number of tiles is 7 and the number of tile encoding units is 3, a process on each of tiles 1 to 3 is assigned to the tile encoding unit 5-1, a process on each of tiles 4 and 5 is assigned to the tile encoding unit 5-2, and a process on each of tiles 6 and 7 is assigned to the tile encoding unit 5-3. Further, even when the number of tiles obtained through the partitioning is less than the number of tile encoding units, control can be carried out in such a way that two or more tiles are assigned to each tile encoding unit.

When the filter parameter share flag outputted from the encoding control unit 1 is OFF (step ST2), the process of each tile encoding unit 5-n and the process of each tile loop filter unit 7-n are carried out continuously (steps ST3 and ST4). At this time, the process by each tile encoding unit 5-n and the process by each tile loop filter unit 7-n are repeatedly carried out a number of times corresponding to the number of tiles (steps ST5 and ST6), and the process of each loop is carried out independently. Therefore, the processes of loops whose number is equal to the number of tile encoding units 5-n can be carried out in parallel. Because it is possible to parallelize the process of encoding each tile and the process of loop filtering each tile together when the filter parameter share flag is OFF, it becomes able to further improve the parallelism of the encoding process. Further, because the filter parameters are localized, this leads to an improvement in the image quality when the picture has a property greatly varying for each image region. The details of the process carried out by each tile encoding unit 5-n and the process carried out by the corresponding tile loop filter unit 7-n will be mentioned below.

In contrast, when the filter parameter share flag outputted from the encoding control unit 1 is ON (step ST2), each tile encoding unit 5-n repeatedly carries out the encoding process of encoding a tile until the encoding process on all tiles is completed (steps ST8 to ST10), and, when the encoding process on all the tiles is completed, the loop filter control unit 6 acquires a local decoded image per frame which is the one of the entire screen from a tile local decoded image generated by each tile encoding unit 5-n, determines a filter per frame suitable for the local decoded image per frame and outputs filter parameters showing the filter to the tile loop filter unit 7-n and the parallel processing ending unit 8 (step ST11). The details of the process carried out by the loop filter control unit 6 will be mentioned below. When receiving the filter parameters from the loop filter control unit 6, the tile loop filter unit 7-n repeatedly carries out a filtering process on the tile local decoded image until filtering processes on all tile local decoded images are completed (steps ST12 to ST14).

Because the filter parameters are shared among all the tiles when the filter parameter share flag is ON, the code amount of the filter parameters can be reduced as compared with the case in which the filter parameter share flag is OFF. Further, designing the filter parameters by using the local decoded image of the entire frame is more effective for an improvement in the image quality, and so on. However, when the filter parameter share flag is ON, the parallel performance of the encoding process drops because there is a necessity to temporarily establish synchronization in the parallel processing between each tile encoding unit 5-n and the corresponding tile loop filter unit 7-n. In the video decoding device which will be mentioned below, even when decoding a bitstream generated at a time when the filter parameter share flag is ON, the parallel performance does not drop.

When the filtering processes by the tile loop filter units 7-1 to 7-N are completed, the parallel processing ending unit 8 combines the tile local decoded images on which the filtering processes are respectively performed by the tile loop filter units 7-1 to 7-N to generate a local decoded image per frame according to the tile partitioning control information outputted from the encoding control unit 1, and stores the local decoded image in the motion-compensated prediction frame memory 4, and also outputs the bit sequence data outputted from each of the tile loop filter units 7-1 to 7-N to the variable length code multiplexing unit 9. Further, when the filter parameter share flag outputted from the encoding control unit 1 is ON, the parallel processing ending unit 8 outputs encoded data about the filter parameters which is outputted from the loop filter control unit 6 and which shows the filter per frame to the variable length code multiplexing unit 9.

When the filter parameter share flag outputted from the encoding control unit 1 is OFF, the variable length code multiplexing unit 9 multiplexes the bit sequence data outputted from the parallel processing ending unit 8 (bit sequence data generated by each of the tile encoding units 5-1 to 5-N), and the tile partitioning control information and the filter parameter share flag which are outputted from the encoding control unit 1 by using a predetermined method to generate a bitstream (step ST7). In contrast, when the filter parameter share flag is ON, the variable length code multiplexing unit multiplexes the bit sequence data outputted from the parallel processing ending unit 8 (bit sequence data generated by each of the tile encoding units 5-1 to 5-N), the tile partitioning control information and the filter parameter share flag which are outputted from the encoding control unit 1, and the encoded data about the filter parameters which is outputted from the loop filter control unit 6 and which shows the filter per frame by using a predetermined method to generate a bitstream (step ST15).

Next, the process carried out by each of the tile encoding units 5-1 to 5-N in the tile encoding device 5 will be explained in detail. The tile encoding device 5 is equipped with the N tile encoding units 5-1 to 5-N, and each of the N tile encoding units 5-1 to 5-N carries out a prediction difference encoding process (prediction difference encoding process without making any reference to information about other tiles) independently.

Figure 12:
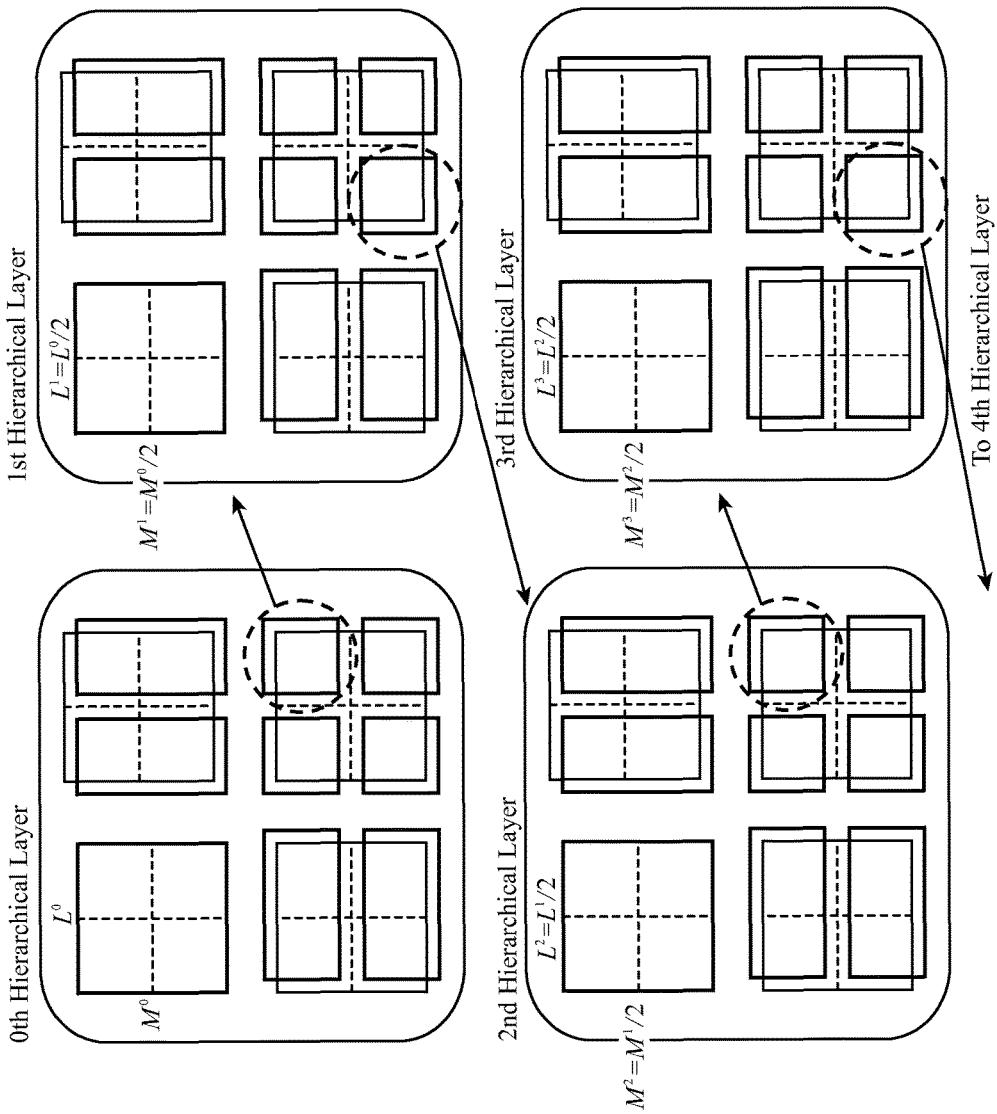
FIG. 12 is an explanatory drawing showing an example in which each largest coding block is divided hierarchically into a plurality of coding target blocks.

The tile encoding control unit 21 of each tile encoding unit 5-$n$ determines the size of a largest coding block (LCU) and an upper limit on the number of hierarchical layers for partitioning, and processes of steps ST21 to ST31 of FIG. 4 are carried out on the image region of each LCU in a specific order. First, the tile encoding control unit 21 outputs a command to hierarchically partition a tile into coding target blocks each having a coding block size until the number of layers reaches the upper limit determined as above of the number of hierarchical layers for partitioning to the block partitioning unit 22, and also determines a coding mode for each of the coding target blocks (step ST21 of FIG. 4). The block partitioning unit 22 partitions each tile distributed thereto by the parallel processing starting unit 3 into blocks each having the coding block size (blocks each of which is a unit for prediction process) according to the command from the tile encoding control unit 21, and outputs a coding target block which is a unit for prediction process. FIG. 12 is an explanatory drawing showing an example in which each largest coding block is hierarchically partitioned into a plurality of coding target blocks. Referring to FIG. 12, each largest coding block is a coding target block whose luminance component, which is shown by "0th hierarchical layer", has a size of $(L^0, M^0)$.

By carrying out the hierarchical partitioning with each block having the LCU size being set as a start point until the depth of the hierarchy reaches a predetermined depth which is set separately according to a quadtree structure, the coding target blocks can be acquired. At the depth of n, each coding target block is an image region having a size of $(L^n, M^n)$. In this example, although $L^n$ and $M^n$ can be the same as or differ from each other, the case of $L^n=M^n$ is shown in FIG. 12. Hereafter, the coding block size determined by the tile encoding control unit 21 is defined as the size of $(L^n, M^n)$ in the luminance component of each coding target block. Because quadtree partitioning is carried out, $(L^{n+1}, M^{n+1}) = (L^n/2, M^n/2)$ is always established.

In the case of a color video image signal (4:4:4 format), such as an RGB signal, in which all the color components have the same sample number, all the color components have a size of $(L^n, M^n)$, while in the case of handling a 4:2:0 format, a corresponding color difference component has a coding block size of $(L^n/2, M^n/2)$. Hereafter, each coding target block in the nth hierarchical layer is expressed as $B^n$, and a coding mode selectable for each coding target block $B^n$ is expressed as $m(B^n)$. In the case of a color video signal which consists of a plurality of color components, the coding mode $m(B^n)$ can be formed in such a way that an individual mode is used for each color component, or can be formed in such a way that a common mode is used for all the color components. Hereafter, an explanation will be made by assuming that the coding mode indicates the one for the luminance component of a coding block having a 4:2:0 format in a YUV signal unless otherwise specified.

Figure 13:
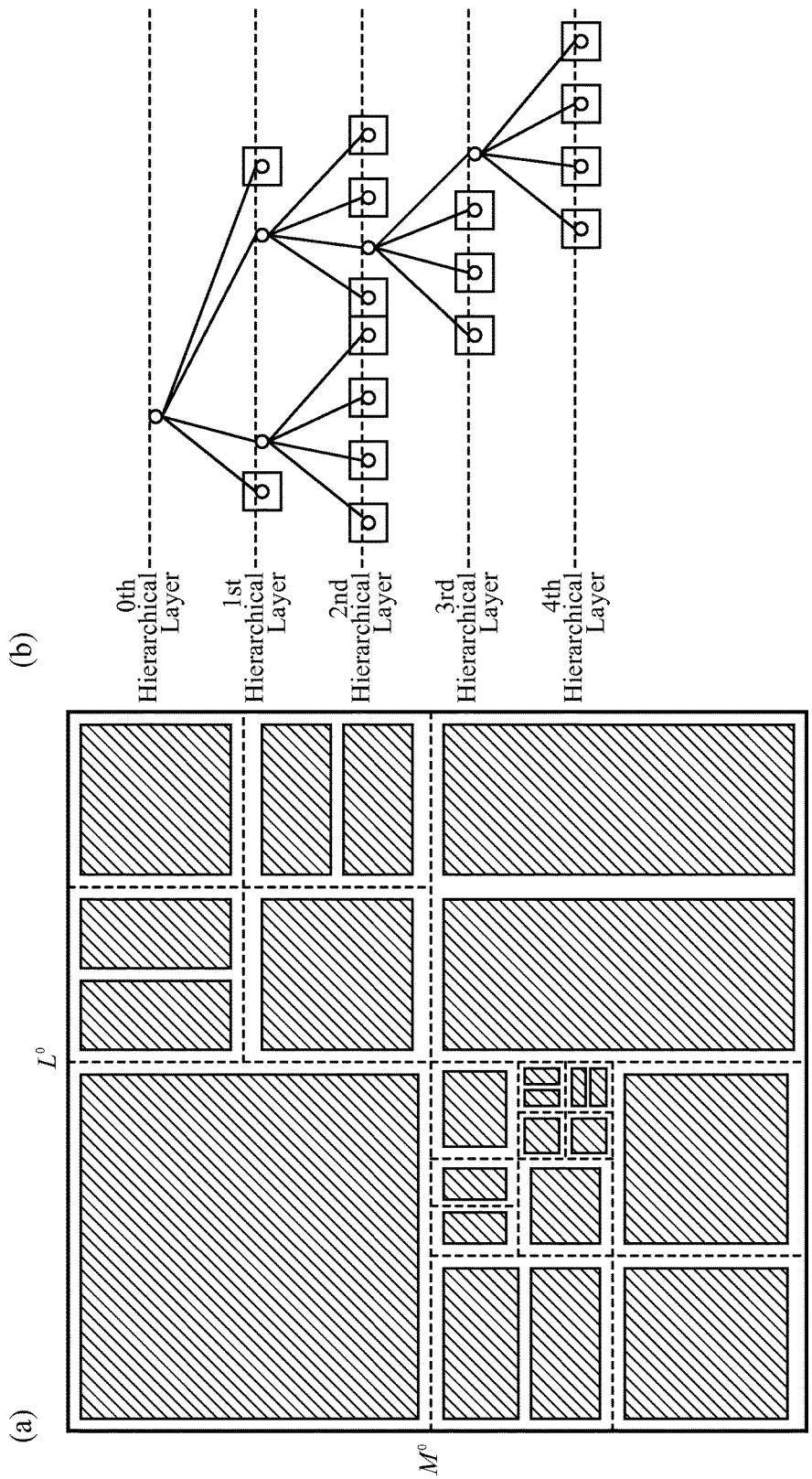
FIG. 13 is an explanatory drawing showing, with a quadtree graph, a distribution of partitions obtained through the partitioning, and a situation in which a coding mode m($B^n$) is assigned to each partition obtained through the hierarchical layer partitioning.

The coding mode $m(B^n)$ can be one of one or more intra coding modes (generically referred to as "INTRA") or one or more inter coding modes (generically referred to as "INTER"), and the tile encoding control unit 21 selects a coding mode with the highest coding efficiency for each coding target block $B^n$ from among all the coding modes available in the picture currently being processed or a subset of these coding modes. Each coding target block $B^n$ is further partitioned into one or more units for prediction process (partitions) by the block partitioning unit 22, as shown in FIG. 13. Hereafter, each partition belonging to a coding target block $B^n$ is expressed as $P_i^n$ (i shows a partition number in the nth hierarchical layer). How the partitioning of each coding target block $B^n$ into partitions is carried out is included as information in the coding mode $m(B^n)$. Although a prediction process is carried out on every partition $P_i^n$ according to the coding mode $m(B^n)$, and a prediction parameter is selected for each coding target block $B^n$ or each partition $P_i^n$.

The tile encoding control unit 21 generates such a block partitioning state as shown in, for example, FIG. 13 for each largest coding block, and then determines coding target blocks. Hatched portions shown in FIG. 13(a) show a distribution of partitions after the partitioning, and FIG. 13(b) shows a situation in which coding modes $m(B^n)$ are respectively assigned to the partitions according to the hierarchical layer partitioning by using a quadtree graph. Each node enclosed by □ shown in FIG. 13 (b) is a node (coding target block) to which a coding mode $m(B^n)$ is assigned.

When the coding mode $m(B^n)$ determined by the tile encoding control unit 21 is an intra coding mode (in the case of $m(B^n) \in$ INTRA), the select switch 23 outputs the coding target block $B^n$ outputted from the block partitioning unit 22 to the intra prediction unit 24. In contrast, when the coding mode $m(B^n)$ determined by the tile encoding control unit 21 is an inter coding mode (in the case of $m(B^n) \in$ INTER), the select switch outputs the coding target block $B^n$ outputted from the block partitioning unit 22 to the motion-compensated prediction unit 25.

When the coding mode $m(B^n)$ determined by the tile encoding control unit 21 is an intra coding mode (in the case of $m(B^n) \in$ INTRA), and the intra prediction unit 24 receives the coding target block $B^n$ from the select switch 23 (step ST22), the intra prediction unit 24 carries out an intra prediction process on each partition $P_i^n$ in the coding target block $B^n$ by using the intra prediction parameter determined by the tile encoding control unit 21 while referring to the local decoded image stored in the tile local decoded image memory 30, to generate an intra prediction image $P_{INTRAi}^n$ (step ST23).

Because the local decoded images stored in the tile local decoded image memory 30 are only the local decoded images of blocks belonging to the current tile, an intra prediction process which is the same as an intra prediction on a screen edge which does not need any reference to an adjacent pixel is carried out on a tile end. Further, because the video decoding device shown in FIG. 6 needs to generate an intra prediction image which is completely the same as the intra prediction image $P_{INTRAi}^n$, the intra prediction parameter used for the generation of the intra prediction image $P_{INTRAi}^n$ in is outputted from the tile encoding control unit 21 to the variable length encoding unit 31 and is multiplexed into the bitstream.

When the coding mode $m(B^n)$ determined by the tile encoding control unit 21 is an inter coding mode (in the case of $m(B^n) \in$ INTER) and the motion-compensated prediction unit 25 receives the coding target block $B^n$ from the select switch 23 (step ST22), the motion-compensated prediction unit 25 compares each partition $P_i^n$ in the coding target block $B^n$ with the local decoded image which is stored in the motion-compensated prediction frame memory 4 and on which a filtering process is performed to search for a motion vector, and carries out the inter prediction process on each partition $P_i^n$ in the coding target block $B^n$ by using both the motion vector and the inter prediction parameter determined by the tile encoding control unit 21 to generate an inter prediction image $P_{INTERi}^n$ (step ST24). Because the video decoding device shown in FIG. 6 needs to generate an inter prediction image which is completely the same as the inter prediction image $P_{INTERi}^n$, the inter prediction parameter used for the generation of the inter prediction image $P_{INTERi}^n$ is outputted from the tile encoding control unit 21 to the variable length encoding unit 31 and is multiplexed into the bitstream, and the motion vector is outputted from the motion-compensated prediction unit 25 to the variable length encoding unit 31 and is multiplexed into the bitstream.

When receiving the coding target block $B^n$ from the block partitioning unit 22, the subtracting unit 26 subtracts the intra prediction image $P_{INTRAi}^n$ generated by the intra prediction unit 24 or the inter prediction image $P_{INTERi}^n$ generated by the motion-compensated prediction unit 25 from each partition $P_i^n$ in the coding target block $B^n$, and outputs a prediction difference signal $e_i^n$ which is the result of the subtraction to the transformation/quantization unit 27 (step ST25). When receiving the prediction difference signal $e_i^n$ from the subtracting unit 26, the transformation/quantization unit 27 carries out an orthogonal transformation process (e.g., a DCT (discrete cosine transform) or an orthogonal transformation process, such as a KL transform, in which bases are designed for a specific learning sequence in advance) on the prediction difference signal $e_i^n$ by referring to the prediction difference coding parameter determined by the tile encoding control unit 21 to calculate transform coefficients of the signal. The transformation/quantization unit 27 also quantizes the transform coefficients by referring to the prediction difference coding parameter and then outputs compressed data which are the transform coefficients quantized thereby to the inverse quantization/inverse transformation unit 28 and the variable length encoding unit 31 (step ST26).

When receiving the compressed data from the transformation/quantization unit 27, the inverse quantization/inverse transformation unit 28 inverse-quantizes the compressed data by referring to the prediction difference coding parameter determined by the tile encoding control unit 21. The inverse quantization/inverse transformation unit 28 also carries out an inverse orthogonal transformation process (e.g., an inverse DCT or an inverse KL transform) on the transform coefficients which are the compressed data inverse-quantized thereby by referring to the prediction difference coding parameter to calculate a local decoded prediction difference signal corresponding to the prediction difference signal $e_i^n$ outputted from the subtracting unit 26 (step ST29).

When receiving the local decoded prediction difference signal from the inverse quantization/inverse transformation unit 28, the adding unit 29 adds the local decoded prediction difference signal and the intra prediction image $P_{INTRAi}^n$ generated by the intra prediction unit 24 or the inter prediction image $P_{INTERi}^n$ generated by the motion-compensated prediction unit 25 to calculate a local decoded image corresponding to the coding target block $B^n$ outputted from the block partitioning unit 22 as a local decoded partition image or a collection of local decoded partition images (step ST30). The adding unit 29 stores the local decoded image in the tile local decoded image memory 30. This local decoded image is an image signal for a subsequent intra prediction in the current tile.

When the processes of steps ST22 to ST30 on all the coding target blocks $B^n$ are completed (steps ST27 and ST28), the variable length encoding unit 31 variable-length-encodes the compressed data outputted from the transformation/quantization unit 27, the coding mode $m(B^n)$ outputted from the tile encoding control unit 21, the intra prediction parameter (when the coding mode is an intra coding mode) or the inter prediction parameter (when the coding mode is an inter coding mode) which is outputted from the tile encoding control unit 21, and the motion vector outputted from the motion-compensated prediction unit 25 (when the coding mode is an inter coding mode), and generates bit sequence data showing the results of the encoding (step ST31). While the internal state of the variable length encoding unit 31 is updated as the encoding process advances when context adaptive arithmetic encoding or the like is used as an example of the variable length coding method, a handover of the internal state between tiles is prevented assuming that a predetermined fixed value or a value outputted from the parallel processing starting unit 3 shown in FIG. 1 is used as an initial value of this internal state.

Further, in the operation of each tile encoding unit 5-$n$, no reference to the coding parameter and the local decoded image of a block belonging to a tile different from the current tile is carried out in any processes including the above-mentioned intra prediction and variable length encoding. A referring process carried out at a tile end is replaced by a process which does not need any reference. It is necessary to make by which process the referring process is replaced in the video encoding device match that in the video decoding device. To this end, an identical process can be carried out fixedly in the encoding side and in the decoding side, or information showing process descriptions can be signaled. As mentioned above, the processes by the tile encoding units 5-1 to 5-N are independent of one another for each of tiles and can be carried out in parallel. Further, when a plurality of tiles are outputted from the parallel processing starting unit 3 to one module of the tile encoding units 5-1 to 5-N, this module sequentially carries out the encoding process on each of the tiles. Further, the independence between tiles is retained even if the tiles are encoded by the same module, and each tile encoding unit operates in such a way that the bit sequence outputted thereby is equal to that outputted thereby when carrying out the process in parallel.

Further, each tile encoding unit 5-$n$ can partition the current tile into one or more structural units which are called slices, and can process the one or more structural units. Slices are structural units into which a tile is further partitioned, and each slice includes either one or more LCUs which are processed continuously or one or more coding blocks each of which is smaller than an LCU. A parameter and a mode which are independently determined for each slice can be used inside the same slice. Further, like in the case of tiles, processes including a process of prohibiting a reference to information about a block belonging to a slice different from a current slice, and a process of initializing the internal state of entropy encoding with a block at the head of a slice can be carried out. Slices have an effect of facilitating parallel processing, like tiles. Further, data can be used for packetizing, such as packetizing a bit sequence outputted by processing one slice. Further, there is provided an advantage also in respect of error resistance. When the inside of a tile is partitioned into slices, information including information about the partitioning into the slices, a parameter and mode information set independently for each slice, and a flag showing whether or not to make a reference to information over a slice boundary is multiplexed into the bitstream and is transmitted to the decoding side. When the above-mentioned context adaptive arithmetic encoding is used as the variable length encoding method, there is a case in which the context adaptive arithmetic encoding process is bottleneck for the processing speed because computations in the context adaptive arithmetic encoding process are complicated. Because it is desirable to complete the encoding on all the tiles simultaneously in order to improve the parallel processing property of the tile encoding process, the video encoding device is constructed in such a way as to restrict a part of the context adaptive arithmetic encoding process on a per slice basis.

Concretely, in a case in which variable length encoding process control information is multiplexed into the slice header, and this variable length encoding process control information indicates that the video encoding device is restricted from carrying out context switching, the video encoding device carries out adaptive arithmetic encoding without carrying out context switching on the slice currently being processed. Similarly, when the above-mentioned variable length encoding process control information indicates that the video encoding device is restricted from carrying out the context switching and the adaptive process, the video encoding device carries out arithmetic encoding without carrying out the context switching and the adaptive process on the slice currently being processed. Because the video encoding device is constructed in this way, the video encoding device can carry out the variable length encoding process while omitting the context switching and the adaptive process properly. By adding a restriction on the encoding process on the slice to be processed next time in a tile which is determined to provide a longer time required to perform the encoding as compared with other tiles, as mentioned above, the video encoding device can carry out the encoding process on the tile at a high speed and can shorten the difference between the encoding processing time required for the tile and that required for another tile, thereby being able to improve the parallel processing property of the tiles. Although the context adaptive arithmetic encoding is explained as an example, even when using any other variable length encoding method, the video encoding device can provide the same advantages by using the same means as long as the video encoding device can carry out the variable length encoding even if a part of processes according to the other variable length encoding method is removed.

Next, the process carried out by each of the tile loop filter units 7-1 to 7-N in the tile loop filtering device 7 will be explained in detail. Each tile loop filter unit 7-$n$ carries out a design of a filter for correcting a coding distortion included in the local decoded image, and a filtering process. The loop filtering process is the filtering process of carrying out one or more different types of loop filters (a deblocking filter for relieving discontinuity at a block boundary, an SAO (Sample Adaptive Offset) for correcting a variation in a dc component due to a quantization error and discontinuity at an edge, an adaptive loop filter for designing a filter minimizing an error with the inputted image as occasion demands, and so on) on the inputted local decoded image in a sequential manner. At this time, in performing either of the filtering processes, each tile loop filter unit carries out a filtering process without making a reference to any pixel over a tile boundary and to any other information.

When the filter parameter share flag outputted from the encoding control unit 1 shown in FIG. 1 is ON, the filter per frame shown by the filter parameters outputted from the loop filter control unit 6 is used. In contrast, when the filter parameter share flag is OFF, the tile loop filter control unit 41 determines a filter per tile suitable for the tile local decoded image outputted from each tile encoding unit 5-$n$ and uses the filter.

Hereafter, an example in which the filter which each tile encoding unit 5-$n$ uses is an adaptive loop filter (ALF) will be explained. An ALF is a technique of partitioning a screen into a fixed number of filter definition regions, and defining a filter that minimizes an error between the local decoded image and the inputted image for each of the filter definition regions. Filter parameters for an ALF are information showing the shape of each region obtained through the partitioning, and the shape and the filter coefficient of a filter defined for each region. In this embodiment, for the sake of simplicity, a case in which the number of filter definition regions is 16, and a region partitioning method of partitioning a rectangle (a frame or a tile) which is a unit to be processed into 4×4 rectangular regions is used will be considered.

Figure 14:
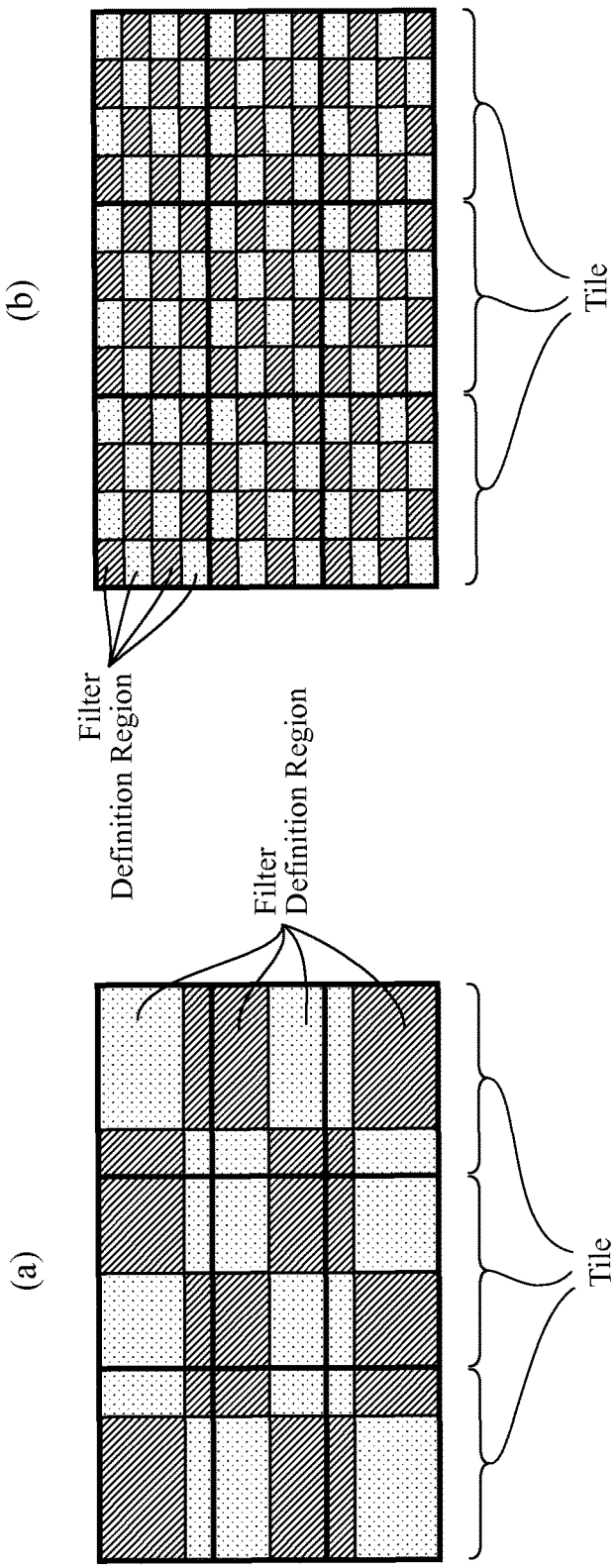
FIG. 14 is an explanatory drawing showing tiles and filter definition regions.

When the filter parameter share flag outputted from the encoding control unit 1 is ON, the loop filter control unit 6 shown in FIG. 1 partitions one frame of local decoded image into 16 filter definition regions in a 4×4 lattice (refer to FIG. 14($a$)), and determines a filter shape and a filter coefficient for each filter definition region. The loop filter control unit also determines information about a relative position of each filter definition region within each tile, and outputs the relative position information and the filter shape and filter coefficient information, as filter parameters, to each tile. When receiving the relative position and the filter shape and filter coefficient information of each filter definition region from the loop filter control unit 6, the loop filter performing unit 42 of each tile loop filter unit 7-$n$ carries out a filtering process on the basis of the relative position and the filter shape and filter coefficient information.

In the example shown in FIG. 14, because 16 types of filters can be designed for each tile when the filter parameter share flag is OFF, 144 types of filters are designed for each entire frame. Therefore, there can be provided an advantage of providing a greater improvement in the image quality of, for example, an image whose characteristics vary largely and locally. In contrast, the design of 16 types of filters for each tile results in over performance from the viewpoint of an improvement in the image quality, and may cause, rather than this improvement, a problem of increasing the code amount of the filter parameters. In such a case, by setting the filter parameter share flag, the code amount of the filter parameters can be reduced and the loop filtering process can be carried out efficiently.

When the filter parameter share flag is OFF, the tile loop filter control unit 41 carries out partitioning into filter definition regions on each tile independently and determines a filter shape and a filter coefficient for each of the filter definition regions (refer to FIG. 14($b$)), and outputs filter definition region information and filter shape and filter coefficient information, as filter parameters, to the loop filter performing unit 42. When receiving the filter definition region information and the filter shape and filter coefficient information from the tile loop filter control unit 41, the loop filter performing unit 42 carries out a filtering process on the basis of the filter definition region information and the filter shape and filter coefficient information.

When the filter parameter share flag is OFF, the variable length encoding unit 43 variable-length-encodes the filter definition region information and the filter shape and filter coefficient information which are outputted from the tile loop filter control unit 41, multiplexes the results of the encoding into the bit sequence data outputted from the tile encoding unit 5-*n*, and outputs the bit sequence data to the parallel processing ending unit 8. In contrast, when the filter parameter share flag is ON, the variable length encoding unit outputs the bit sequence data outputted from the tile encoding unit 5-*n* to the parallel processing ending unit 8, just as it is.

Figure 15:
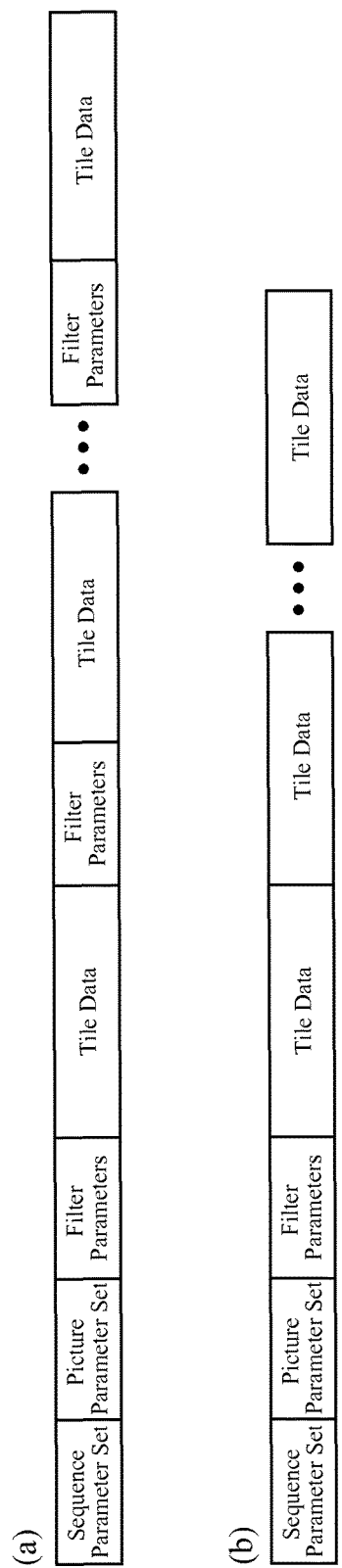
FIG. 15 is an explanatory drawing showing a bitstream into which filter parameters are multiplexed.

As a result, while up to one set of filter parameters is defined for each frame when the filter parameter share flag is ON, up to one set of filter parameters is defined for each tile when the filter parameter share flag is OFF. When the filter parameter share flag is ON, the filter parameters are multiplexed into the bitstream as, for example, the header of the picture, as shown in FIG. 15(*a*). When the filter parameter share flag is OFF, the filter parameters defined for each tile are multiplexed into the bitstream at the start position of each tile data as, for example, the header of the tile, as shown in FIG. 15(*b*).

Figure 16:
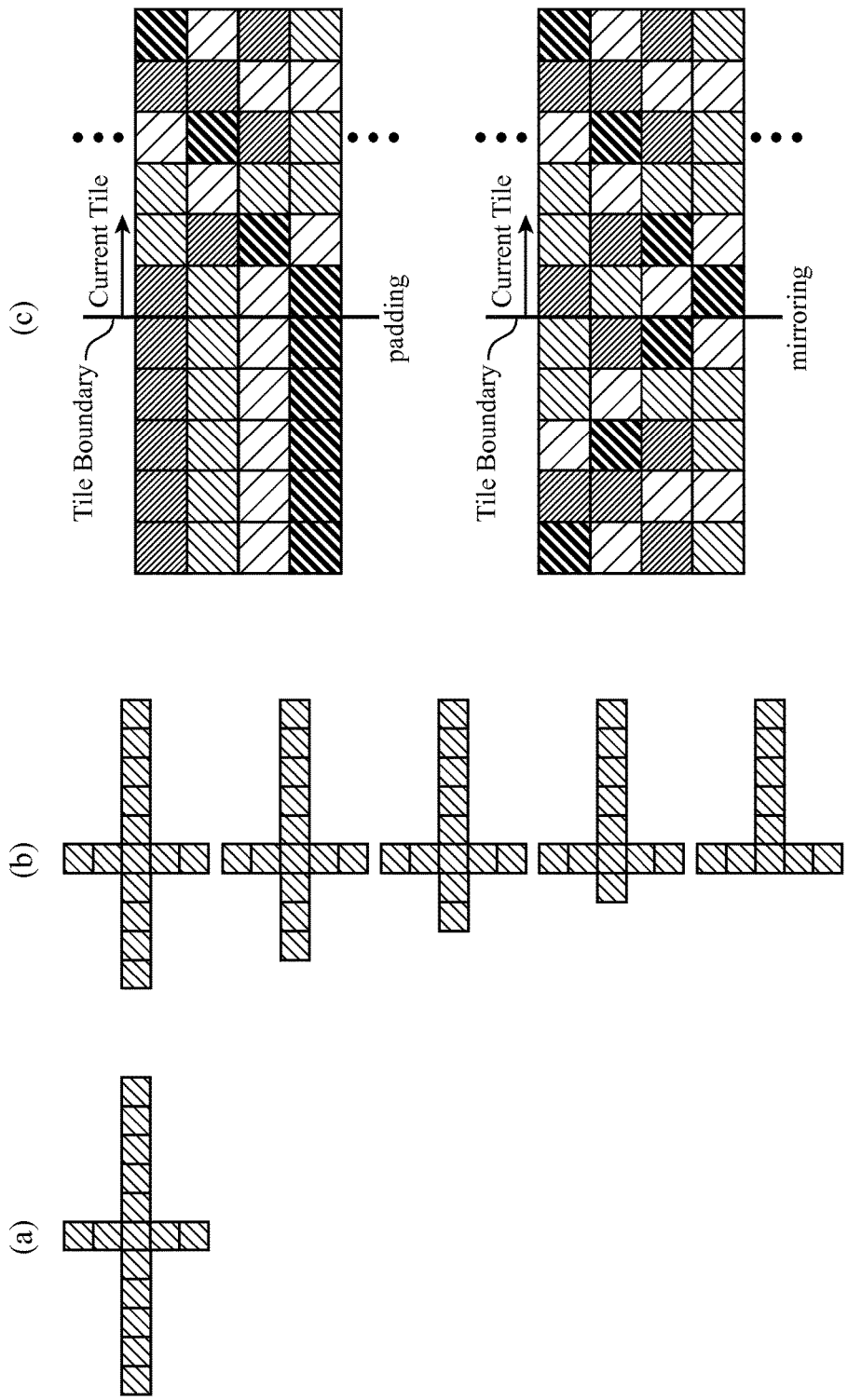
FIG. 16 is an explanatory drawing showing a filtering process on a filter boundary.

As mentioned above, the loop filter performing unit 42 carries out a filtering process on the tile local decoded image by using the filter shown by the filter parameters outputted from either the loop filter control unit 6 or the tile loop filter control unit 41. At this time, the loop filter performing unit carries out a filtering process of not referring to any pixel in a tile different from the current tile at a tile boundary. For example, when using a linear filter having such a filter shape as shown in FIG. 16 (*a*), the loop filter performing unit changes the filter shape at a filter boundary in such a way that a region located outside the filter boundary is not referred to, as shown in FIG. 16(*b*). As an alternative, the loop filter performing unit carries out a filtering process of not referring to any pixel in a tile different from the current tile by carrying out a process of copying a pixel located in the vicinity of a filter boundary, as shown in FIG. 16(*c*).

It is necessary to make the filtering method, for use in the video encoding device, which does not need any reference to a pixel between different tiles match that for use in the video decoding device. To this end, an identical method can be used fixedly in the encoding side and in the decoding side, or information showing process descriptions can be signaled. Even when the filter parameter share flag is ON and the same filter parameters are used for a tile adjacent to the current tile, no reference to a pixel over a tile boundary is made. While parallelization of the loop filtering process by each tile encoding unit 7-*n* is enabled because no reference to a pixel over a tile boundary is made, parallelization of the loop filtering process is enabled in decoding of the bitstream generated by this tile encoding unit 7-*n*.

Next, processing carried out by the video decoding device shown in FIG. 6 will be explained concretely. When receiving the bitstream generated by the video encoding device shown in FIG. 1, the variable length code demultiplexing unit 51 separates the filter parameter share flag which is multiplexed into the bitstream, and outputs the filter parameter share flag to the filter parameter decoding unit 55 and each tile loop filter unit 56-*n*. Further, the variable length code demultiplexing unit 51 separates the tile partitioning control information which is multiplexed into the bitstream, and outputs the tile partitioning control information to the tile partitioning control unit 57. When the filter parameter share flag is ON, the variable length code demultiplexing unit separates the encoded data about the filter parameters showing the filter per frame which is multiplexed into the bitstream and outputs the encoded data about the filter parameters to the filter parameter decoding unit 55. Further, the variable length code demultiplexing unit 51 separates the bit sequence data corresponding to the number of tiles, the bit sequence data being multiplexed into the bitstream, and outputs the bit sequence data to the parallel processing starting unit 52 (step ST41 of FIG. 7).

When receiving the tile partitioning control information from the variable length code demultiplexing unit 51, the tile partitioning control unit 57 grasps the partitioning state of the tiles from the tile partitioning control information (step ST42), and controls the arrangement of each tile decoded image in the parallel processing ending unit 58, which will be mentioned below, in such a way that a decoded image corresponding to the original inputted image is acquired. When receiving the bit sequence data corresponding to the number of tiles (bit sequence data per frame) from the variable length code demultiplexing unit 51, the parallel processing starting unit 52 divides the bit sequence data into a plurality of data per tile, and distributes the plurality of bit sequence data per tile among the tile decoding units 54-1 to 54-N.

When the filter parameter share flag outputted from the variable length code demultiplexing unit 51 is ON (step ST43), the filter parameter decoding unit 55 decodes the encoded data outputted from the variable length code demultiplexing unit 51 into the filter parameters showing the filter per frame, and outputs the filter parameters to each tile loop filter unit 56-*n* (step ST44).

The process of each tile decoding unit 54-*n* and the process of each tile loop filter unit 56-*n* are carried out continuously (steps ST45 and ST46), and these two processes are carried out repeatedly on all the tiles (steps ST47 and ST48). Because the processes on each tile within the loop of steps ST45 to ST48 are independent of those on any other tile, as will be mentioned below, the processes on each tile can be performed in parallel. Unlike in the video encoding device shown in FIG. 1, the processes of steps ST45 to ST48 can be parallelized collectively regardless of whether the filter parameter share flag is ON or OFF.

When the decoding process and the loop filtering process on all the tiles are completed (step 47), under the control of the tile partitioning control unit 57, the parallel processing ending unit 58 combines the tile decoded images on which the filtering processes are performed by the tile loop filter units 56-1 to 56-N to generate a decoded image per frame and stores this decoded image in the motion-compensated prediction frame memory 53, and also outputs the decoded image, as a reproduced image, to outside the video decoding device.

Next, the process carried out by each of the tile decoding units 54-1 to 54-N in the tile decoding device 54 will be explained in detail. The tile decoding device 54 is equipped with the N tile decoding units 54-1 to 54-N, and each of the N tile decoding units 54-1 to 54-N carries out a prediction difference decoding process (prediction difference decoding process without making a reference to any information between tiles) independently.

When receiving bit sequence data per tile distributed thereto by the parallel processing starting unit 52, the variable length decoder 61 of each tile decoding unit 54-*n* determines the size of a largest coding block (LCU) and an upper limit on the number of hierarchical layers for partitioning by using the same method as that which the tile encoding control unit 21 shown in FIG. 3 uses. After determining the size of a largest coding block and the upper limit on the number of hierarchical layers for partitioning, the variable length decoder 61 decodes the coding mode m(B") assigned to each largest coding block from the bit sequence data per tile, and also decodes the information showing the partitioning state of each largest coding block, the partitioning state being included in the coding mode m(B″) (step ST51 of FIG. 9). After decoding the information showing the partitioning state of each largest coding block, the variable length decoder 61 specifies decoding target blocks into which the largest coding block is partitioned hierarchically (blocks corresponding to "coding target blocks" in the video encoding device shown in FIG. 1) on the basis of the partitioning state (step ST52).

When the coding mode m(B″) assigned to a decoding target block (coding target block) is an intra coding mode, the variable length decoder 61 decodes the intra prediction parameter for each of the one or more partitions included in the decoding target block from the bit sequence data per tile. In contrast, when the coding mode m(B″) assigned to a decoding target block (coding target block) is an inter coding mode, the variable length decoder decodes the inter prediction parameter and the motion vector for each decoding target block or for each of the one or more partitions included in the decoding target block from the bit sequence data per tile (step ST53).

The variable length decoder 61 further partitions each partition which is a unit for prediction process into one or more partitions each of which is a unit for transformation process on the basis of information about a transformation block size included in the prediction difference coding parameter, and decodes the compressed data (transform coefficients transformed and quantized) for each of the one or more partitions which is a unit for transformation process from the bit sequence data per tile (step ST53). Because the filter parameter share flag is OFF, when the encoded data about the filter parameters showing the filter per tile is multiplexed into the bit sequence data per tile, the variable length decoder 61 separates the encoded data and outputs this encoded data to the tile loop filter unit 56-$n$. The variable length decoder 61 also outputs the coding parameters to the tile loop filter unit 56-$n$.

When the coding mode m(B″) variable-length-decoded by the variable length decoder 61 is an intra coding mode (in the case of m(B″)∈INTRA), the select switch 62 outputs the intra prediction parameter variable-length-decoded by the variable length decoder 61 to the intra prediction unit 63. In contrast, when the coding mode m(B″) variable-length-decoded by the variable length decoder 61 is an inter coding mode (in the case of m(B″)∈INTER), the select switch outputs the inter prediction parameter and the motion vector which are variable-length-decoded by the variable length decoder 61 to the motion compensator 64. When the inputted bit sequence data are the one encoded by using an encoding method, such as context adaptive algebraic encoding, of allowing an internal state to vary according to the encoded results of a previously-processed block, the same value as that of the variable length encoding unit 31 shown in FIG. 3 is used as an initial value of the internal state of the variable length decoder 61, and no handover is carried out between tiles.

When the coding mode m(B″) variable-length-decoded by the variable length decoder 61 is an intra coding mode (in the case of m(B″)∈INTRA), and the intra prediction unit 63 receives the intra prediction parameter from the select switch 62 (step ST54), according to the same procedure as that according to which the intra prediction unit 24 shown in FIG. 3 does, the intra prediction unit 63 carries out an intra prediction process on each partition $P_i^n$ in the decoding target block B″ by using the intra prediction parameter outputted from the select switch 62 while referring to the decoded image stored in the tile decoded image memory 67 to generate an intra prediction image $P_{INTRAi}^n$ (step ST55).

When the coding mode m(B″) variable-length-decoded by the variable length decoder 61 is an inter coding mode (in the case of m(B″)∈INTER), and the motion compensator 64 receives the inter prediction parameter and the motion vector from the select switch 62 (step ST54), the motion compensator 64 carries out an inter prediction process on the decoding target block B″ or each partition $P_i^n$ by using the motion vector and the inter prediction parameter which are outputted from the select switch 62 while referring to the decoded image which is stored in the motion-compensated prediction frame memory 53 and on which a filtering process is performed to generate an inter prediction image $P_{INTERi}^n$ (step ST56). In contrast with this, when a common inter prediction mode and a common reference image indication index are determined for all the partitions $P_i^n$ in the decoding target block B″, the motion compensator 64 carries out an inter prediction process on each partition $P_i^n$ by using both a reference image shared among all the partitions $P_i^n$ which is indicated by the reference image indication index, and the motion vector for the partition $P_i^n$ to generate an inter prediction image $P_{INTERi}^n$.

When receiving the compressed data and the prediction difference coding parameter from the variable length decoder 61, the inverse quantization/inverse transformation unit 65 inverse-quantizes the compressed data by referring to the prediction difference coding parameter according to the same procedure as that according to which the inverse quantization/inverse transformation unit 28 shown in FIG. 3 does, and also carries out an inverse orthogonal transformation process on the transform coefficients which are the compressed data which the inverse quantization/inverse transformation unit inverse-quantizes by referring to the prediction difference coding parameter to calculate a decoded prediction difference signal corresponding to the prediction difference signal outputted from the subtracting unit 26 shown in FIG. 3 (step ST57).

The adding unit 66 adds the decoded prediction difference signal calculated by the inverse quantization/inverse transformation unit 65 and either the intra prediction image $P_{INTRAi}^n$ generated by the intra prediction unit 63 or the inter prediction image $P_{INTERi}^n$ generated by the motion compensator 64, and stores a decoded image in the tile decoded image memory 67 as a collection of one or more decoded partition images included in the decoding target block (step ST58). This decoded image is an image signal for subsequent intra prediction.

In each tile decoding unit 54-$n$, no reference to the decoding parameter and the decoded image of a block different from the current tile is carried out in any processes including the above-mentioned intra prediction and variable length decoding. A referring process carried out at a tile end is replaced by a process which does not need any reference, this process being the same as that carried out by the encoding side. Therefore, the process carried out by each tile decoding unit 54-$n$ is independent of that carried out by any other tile decoding unit for each of the tiles, and can be carried out in parallel. Further, when each tile is partitioned into slices in the encoding side, as mentioned above, each tile decoding unit 54-$n$ partitions the current tile into slices according to slice partitioning information multiplexed into the bitstream, and carries out a decoding process according to a parameter and mode information independently defined for each slice. In addition, when context adaptive arithmetic decoding is used as a variable length decoding method, the video decoding device decodes the variable length coding process control information multiplexed into the slice header, and, when the above-mentioned variable length coding process control information shows that the video decoding device is restricted from carrying out context switching, the video decoding device carries out adaptive arithmetic decoding without carrying out context switching on the slice. Similarly, when the above-mentioned variable length coding process control information shows that the video decoding device is restricted from carrying out context switching and adaptive processing, the video decoding device carries out arithmetic decoding without carrying out context switching and adaptive processing on the slice. Because the video decoding device is constructed in this way, the video decoding device can decode the bitstream generated by the encoder in accordance with the present invention suitably. Although the context adaptive arithmetic decoding is explained as an example, even when using any other variable length decoding method, the video decoding device can provide the same advantages by using the same means as long as the video decoding device can carry out variable length decoding even if a part of processes of the other variable length decoding method is removed.

Next, the process carried out by each of the tile loop filter units 56-1 to 56-N in the tile loop filtering device 56 will be explained in detail. When the filter parameter share flag separated by the variable length code demultiplexing unit 51 is OFF, the tile filter parameter decoding unit 71 of each tile loop filter unit 56-*n* decodes the encoded data about the filter parameters outputted from the tile decoding unit 54-*n* into the filter parameters showing the filter per tile, and outputs the filter parameters which are the result of the decoding to the loop filter performing unit 72.

When the filter parameter share flag separated by the variable length code demultiplexing unit 51 is OFF and therefore the loop filter performing unit 72 receives the filter parameters from the tile filter parameter decoding unit 71, the loop filter performing unit 72 carries out a filtering process on the tile decoded image outputted from the tile decoding unit 54-*n* by using both the filter per tile shown by the filter parameters and the coding parameters variable-length-decoded by the variable length decoder 61 of the tile decoding unit 54-*n*. In contrast, when the filter parameter share flag separated by the variable length code demultiplexing unit 51 is ON and therefore the loop filter performing unit receives the filter parameters from the filter parameter decoding unit 55, the loop filter performing unit carries out a filtering process on the tile decoded image outputted from the tile decoding unit 54-*n* by using both the filter per frame shown by the filter parameters and the coding parameters variable-length-decoded by the variable length decoder 61 of the tile decoding unit 54-*n*. The loop filter performing unit 72 carries out a process which is the same as that carried out by the loop filter performing unit 42 shown in FIG. 5. More specifically, the process carried out by each tile loop filter unit 56-*n* is independent of that carried out by any other tile loop filter unit for each of the tiles and can be carried out in parallel because each tile loop filter unit carries out the filtering process of not making a reference to any pixel over a pixel boundary.

As can be seen from the above description, in accordance with this Embodiment 1, there are provided the encoding control unit 1 that outputs partitioning control information indicating the partitioning state of an inputted image, the parallel processing starting unit 3 that partitions the inputted image into tiles each of which is a rectangular region having a predetermined size according to the partitioning control information outputted from the encoding control unit 1, and that distributes the tiles obtained through the partitioning, and the N tile encoding units 5-1 to 5-N each of that carries out a prediction difference encoding process on a tile distributed thereto by the parallel processing starting unit 3 by referring to a local decoded image stored in the motion-compensated prediction frame memory 4, thereby outputting encoded bit data which is the result of the encoding process, and each of that generates a local decoded image from the encoded bit data, and each of the N tile loop filter units 7-1 to 7-N is constructed in such a way as to determine a filter per tile suitable for a filtering process on the local decoded image generated by the corresponding one of the tile encoding units 5-1 to 5-N and carry out the filtering process on the local decoded image by using the filter, there is provided an advantage of enabling the loop filter units to carry out the filtering processes in parallel on a tile level.

Embodiment 2

In this Embodiment 2, a video encoding device that additionally has a switching function of changing whether or not to perform parallel processing on a tile level in addition to the components of the video encoding device in accordance with above-mentioned Embodiment 1 will be explained. A video decoding device that can decode a video from a bitstream generated by the video encoding device will be explained.

Figure 17:
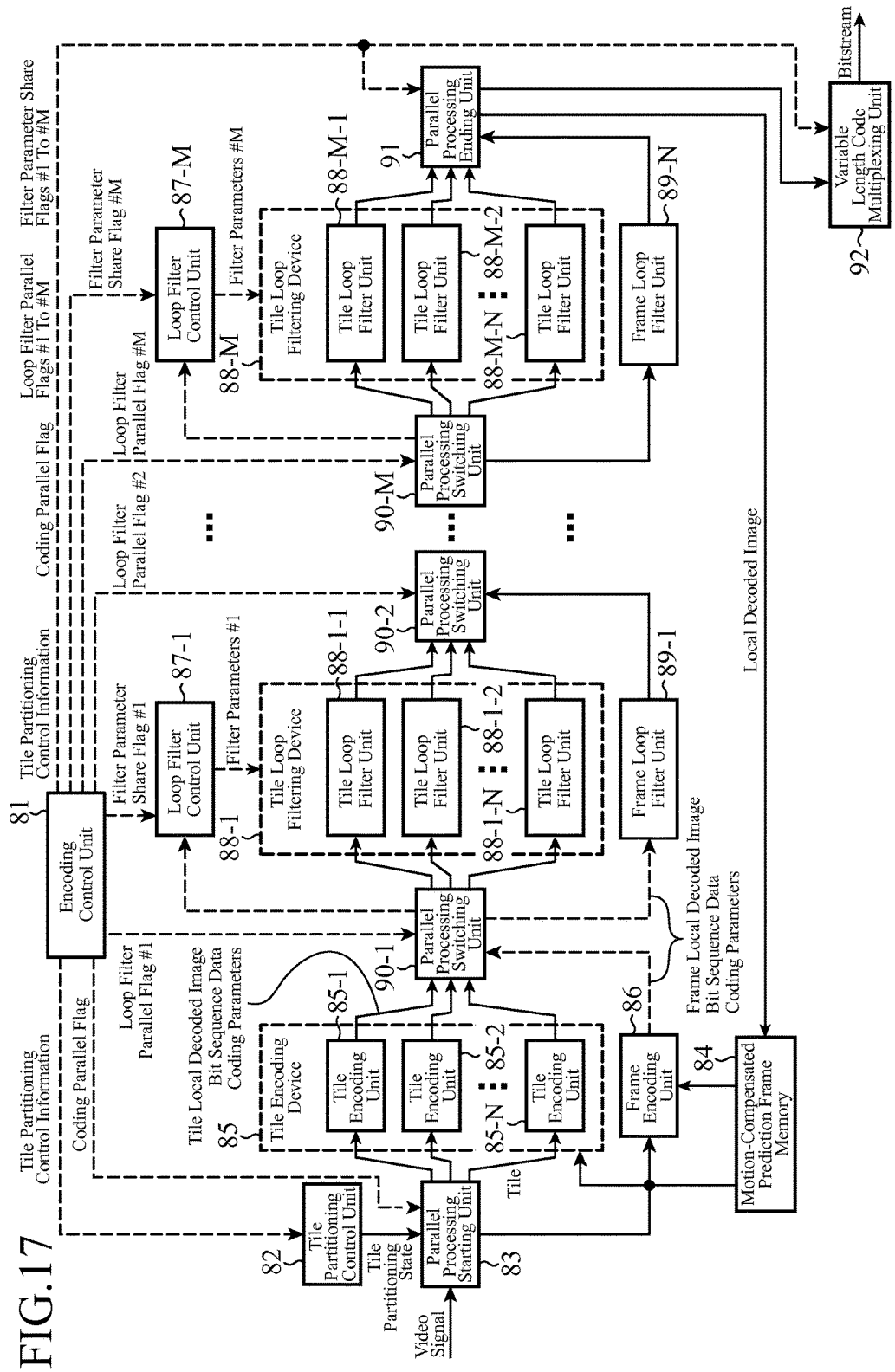
FIG. 17 is a block diagram showing a video encoding device in accordance with Embodiment 2 of the present invention.

FIG. 17 is a block diagram showing the video encoding device in accordance with Embodiment 2 of the present invention. Referring to FIG. 17, an encoding control unit 81 carries out a process of outputting tile partitioning control information (partitioning control information) indicating a partitioning state at the time of partitioning an inputted image shown by a video signal into tiles each having a predetermined size, like the encoding control unit 1 shown in FIG. 1. The encoding control unit 81 also carries out a process of outputting a coding parallel flag (partitioning flag) showing whether or not to partition the inputted image to implement parallelization, and also outputting filter parameter share flags (filter share flags) #1 to #M showing that a filter for use in a filtering process is made to be shared among the tiles for different types of filtering processes respectively. In addition, the encoding control unit 81 carries out a process of outputting loop filter parallel flags #1 to #M showing connection relationships between previous-stage processing units and next-stage processing units respectively. The encoding control unit 81 constructs a partitioning controller.

A tile partitioning control unit 82 carries out a process of controlling the partitioning of the inputted image in a parallel processing starting unit 83 in such a way that the partitioning matches the partitioning state shown by the tile partitioning control information outputted from the encoding control unit 81. When the coding parallel flag outputted from the encoding control unit 81 shows that the inputted image is to be partitioned to implement parallelization, the parallel processing starting unit 83 carries out a process of partitioning the inputted image shown by the video signal into tiles each having a predetermined size and distributing the tiles obtained through the partitioning among tile encoding units 85-1 to 85-N according to a command from the tile partitioning control unit 82. In contrast, when the coding parallel flag shows that the inputted image is not to be partitioned to implement parallelization, the parallel processing starting unit carries out a process of outputting the inputted image which is an image per frame to a frame encoding unit 86 without partitioning the inputted image shown by the video signal. A tile distributor is comprised of the tile partitioning control unit 82 and the parallel processing starting unit 83.

A motion-compensated prediction frame memory 84 is a recording medium for storing a local decoded image on which a filtering process is performed. The motion-compensated prediction frame memory 84 constructs an image memory. A tile encoding device 85 is equipped with the N tile encoding units 85-1 to 85-N, and each of the N tile encoding units 85-1 to 85-N carries out a prediction difference encoding process independently. N is an integer equal to or larger than 1. Each of the tile encoding units 85-1 to 85-N carries out a process of performing a prediction difference encoding process on a tile distributed thereto by the parallel processing starting unit 83 by referring to a local decoded image stored in the motion-compensated prediction frame memory 84 and on which a filtering process is performed, thereby outputting bit sequence data, which is the result of the encoding process, and coding parameters, and also generating a tile local decoded image (local decoded image), like the tile encoding units 5-1 to 5-N shown in FIG. 1. The tile encoding units 85-1 to 85-N construct tile encoders.

The frame encoding unit 86 carries out a process of performing a prediction difference encoding process on the inputted image (image per frame which is not partitioned by the parallel processing starting unit 83) by referring to a local decoded image stored in the motion-compensated prediction frame memory 84 and on which a filtering process is performed, thereby outputting bit sequence data, which is the result of the encoding process, and coding parameters, and also generating a frame local decoded image (local decoded image). The frame encoding unit 86 constructs a frame encoder.

Each of loop filter control units 87-1 to 87-M carries out a process of, when the corresponding one of the filter parameter share flags #1 to #M outputted from the encoding control unit 81 shows that a filter is made to be shared among the tiles, acquiring a local decoded image per frame from the tile local decoded images outputted from the parallel processing switching units 90-1 to 90-M, determining a filter per frame suitable for the local decoded image per frame, and outputting filter parameters showing the filter to the corresponding one of tile loop filtering devices 88-1 to 88-M. Each of the loop filter control units 87-1 to 87-M also carries out a process of variable-length-encoding the filter parameters showing the filter per frame, and outputting encoded data about the filter parameters to a parallel processing ending unit 91.

The tile loop filtering devices 88-1 to 87-M carry out filtering processes of types different from one another respectively, and each of the tile loop filtering devices is equipped with N tile loop filter units 88-$m$-1 to 88-$m$-N ($m$=1, 2, . . . , M) and each of the N tile loop filter units 88-$m$-1 to 88-$m$-N carries out a filtering process independently. M is an integer equal to or larger than 1. When the filter parameter share flag #m outputted from the encoding control unit 81 shows that a filter is made not to be shared among the tiles, each tile loop filter unit 88-$m$-$n$ ($n$=1, 2, . . . , N) determines a filter per tile suitable for a filtering process on the tile local decoded image outputted from the parallel processing switching unit 90-$m$ and carries out the filtering process on the tile local decoded image by using the filter, and also carries out a process of variable-length-encoding the filter parameters showing the filter per tile and multiplexing the result of the encoding into the bit sequence data outputted from the corresponding one of the parallel processing switching units 90-1 to 90-M. In contrast, when the filter parameter share flag #m shows that a filter is made to be shared among the tiles, each tile loop filter unit carries out a filtering process on the tile local decoded image outputted from the parallel processing switching unit 90-$m$ by using the filter per frame shown by the filter parameters outputted from the loop filter control unit 87-$m$, and also carries out a process of outputting the bit sequence data outputted from the parallel processing switching unit 90-$m$, just as it is. Each of the plural sets of the tile loop filter units 88-1-1 to 88-1-N, 88-2-1 to 88-2-N, . . . , and 88-M-1 to 88-M-N constructs tile filters.

When a tile local decoded image is outputted from the parallel processing switching unit 90-$m$, each frame loop filter unit 89-$m$ determines a filter per frame suitable for a filtering process on the frame local decoded image (local decoded image per frame) acquired from the tile local decoded image, and, when a frame local decoded image is outputted from the parallel processing switching unit 90-$m$, determines a filter per frame suitable for the frame local decoded image, and carries out a filtering process on the frame local decoded image by using the filter per frame, and carries out a process of variable-length-encoding the filter parameters showing the filter per frame, and multiplexing the result of the encoding into the bit sequence data outputted from the corresponding one of the parallel processing switching units 90-1 to 90-M. The frame loop filter units 89-1 to 89-M construct a frame filter.

Each parallel processing switching unit 90-$m$ carries out a process of controlling the connection relationship between the previous-stage processing units and the next-stage processing units according to the loop filter parallel flag #m outputted from the encoding control unit 81. As a result, even when the coding parallel flag outputted from the encoding control unit 81 shows that the inputted image is to be partitioned to implement parallelization, if, for example, a filter parameter share flag #x, among the filter parameter share flags #1 to #M outputted from the encoding control unit 81, shows that a filter is made to be shared among the tiles, the parallel processing switching unit outputs the local decoded image, the coding parameters, and the bit sequence data which are outputted from the previous-stage processing unit to the frame loop filter unit 89-$x$, instead of to the tile loop filter unit 88-$x$-$n$.

If the filter parameter share flag #M outputted from the encoding control unit 81 shows that a filter is made not to be shared among the tiles when the coding parallel flag outputted from the encoding control unit 81 shows that the inputted image is to be partitioned to implement parallelization, the parallel processing ending unit 91 carries out a process of combining the tile local decoded images on which the filtering processes are performed by the tile loop filter units 88-M-1 to 88-M-N to generate a local decoded image per frame according to the tile partitioning control information outputted from the encoding control unit 81, and storing the local decoded image in the motion-compensated prediction frame memory 84, and also outputting the bit sequence data outputted from the tile loop filter units 88-M-1 to 88-M-N to a variable length code multiplexing unit 92. In contrast, if a filter parameter share flag #M outputted from the encoding control unit 81 shows that a filter is made to be shared among the tiles when the coding parallel flag shows that the inputted image is to be partitioned to implement parallelization, the parallel processing ending unit carries out a process of storing the frame local decoded image on which the filtering process is performed by the frame loop filter unit 88-M in the motion-compensated prediction frame memory 84 and also outputting the bit sequence data outputted from the frame loop filter unit 88-M to the variable length code multiplexing unit 92. In contrast, when the coding parallel flag shows that the inputted image is not to be partitioned to implement parallelization, the parallel processing ending unit carries out a process of storing the frame local decoded image on which the filtering process is performed by the frame loop filter unit 88-M in the motion-compensated prediction frame memory 84, and also outputting the bit sequence data outputted from the frame loop filter unit 88-M to the variable length code multiplexing unit 92. The parallel processing ending unit 91 constructs a local decoded image storage.

The variable length code multiplexing unit 92 carries out a process of multiplexing the bit sequence data outputted from the parallel processing ending unit 91, the tile partitioning control information, the coding parallel flag, the loop filter parallel flags #1 to #M, and the filter parameter share flags #1 to #M which are outputted from the encoding control unit 81, and the encoded data about the filter parameters showing the filter determined by each tile loop filter unit 88-*m*-*n* or each frame loop filter unit 89-*m* to generate a bitstream. The variable length code multiplexing unit 92 constructs a multiplexer.

In the example shown in FIG. 17, it is assumed that each of the encoding control unit 81, the tile partitioning control unit 82, the parallel processing starting unit 83, the motion-compensated prediction frame memory 84, the tile encoding device 85, the frame encoding unit 86, the loop filter control units 87-1 to 87-M, the tile loop filtering devices 88-1 to 88-M, the frame loop filter units 89-1 to 89-M, the parallel processing switching units 90-1 to 90-M, the parallel processing ending unit 91, and the variable length code multiplexing unit 92, which are the components of the video encoding device, consists of dedicated hardware (e.g., a semiconductor integrated circuit equipped with a CPU, a one chip microcomputer, or the like). In a case in which the video encoding device consists of a computer, a program in which the processes carried out by the encoding control unit 81, the tile partitioning control unit 82, the parallel processing starting unit 83, the tile encoding device 85, the frame encoding unit 86, the loop filter control units 87-1 to 87-M, the tile loop filtering devices 88-1 to 88-M, the frame loop filter units 89-1 to 89-M, the parallel processing switching units 90-1 to 90-M, the parallel processing ending unit 91, and the variable length code multiplexing unit 92 are described can be stored in a memory of the computer, and a CPU of the computer can be made to execute the program stored in the memory.

Figure 18:
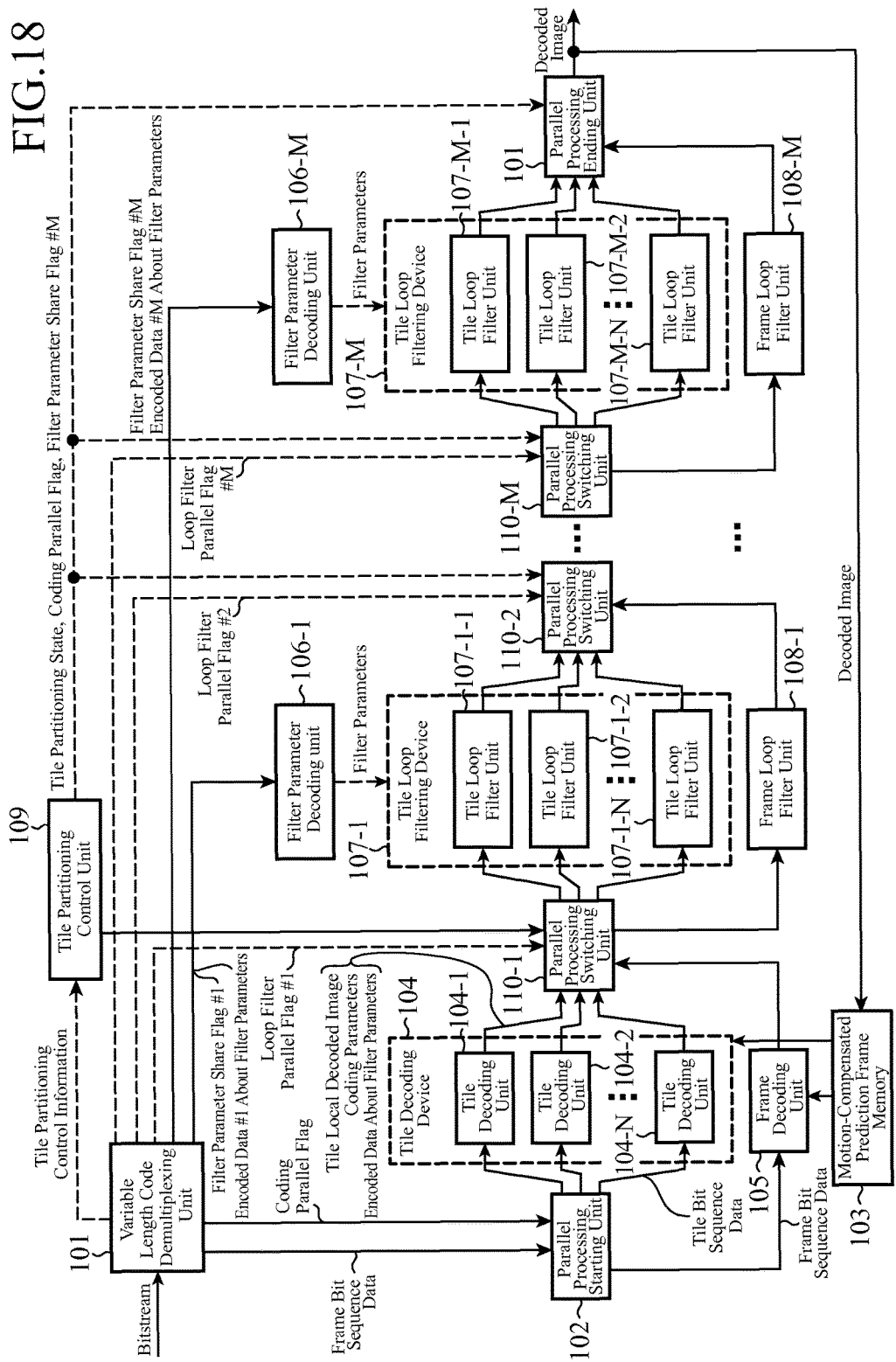
FIG. 18 is a block diagram showing a video decoding device in accordance with Embodiment 2 of the present invention.

FIG. 18 is a block diagram showing a video decoding device in accordance with Embodiment 2 of the present invention. Referring to FIG. 18, when receiving the bitstream generated by the video encoding device shown in FIG. 17, a variable length code demultiplexing unit 101 carries out a process of demultiplexing the bitstream into the bit sequence data, the tile partitioning control information, the coding parallel flag, the loop filter parallel flags #1 to #M, the filter parameter share flags #1 to #M, and the encoded data about the filter parameters, which are multiplexed into the bitstream. The variable length code demultiplexing unit 101 constructs a demultiplexer.

When the coding parallel flag separated by the variable length code demultiplexing unit 101 shows that the inputted image is partitioned to implement parallelization, a parallel processing starting unit 102 carries out a process of dividing the bit sequence data per frame unit outputted from the variable length code demultiplexing unit 101 into a plurality of bit sequence data per tile, and distributing the plurality of bit sequence data per tile among tile decoding units 104-1 to 104-N. In contrast, when the coding parallel flag shows that the inputted image is not partitioned to implement parallelization, the parallel processing starting unit carries out a process of outputting the bit sequence data per frame outputted from the variable length code demultiplexing unit 101 to a frame decoding unit 105. The parallel processing starting unit 102 constructs an encoded bit data distributor. A motion-compensated prediction frame memory 103 is a recording medium for storing a decoded image on which a filtering process is performed. The motion-compensated prediction frame memory 103 constructs an image memory.

A tile decoding device 104 is equipped with the N tile decoding units 104-1 to 104-N, and each of the N tile decoding units 104-1 to 104-N carries out a prediction difference decoding process independently. N is an integer equal to or larger than 1. Each of the tile decoding units 104-1 to 104-N carries out a process of performing a prediction difference decoding process on bit sequence data per tile distributed thereto by the parallel processing starting unit 102 by referring to a decoded image stored in the motion-compensated prediction frame memory 103 and on which a filtering process is performed to generate a tile decoded image (decoded image per tile), like the tile decoding units 54-1 to 54-N shown in FIG. 6, and also outputting the tile decoded image and coding parameters which the tile decoding unit uses when carrying out the prediction difference decoding process (coding parameters multiplexed into the bit sequence data) to a parallel processing switching unit 110-1. Each of the tile decoding units also carries out a process of outputting the encoded data about the filter parameters showing the filter per tile, the encoded data being multiplexed into the bit sequence data, to the parallel processing switching unit 110-1. The tile decoding units 104-1 to 104-N construct tile decoders.

A frame decoding unit 105 carries out a process of performing a prediction difference decoding process on the bit sequence data per frame outputted from the parallel processing starting unit 102 by referring to a local decoded image which is stored in the motion-compensated prediction frame memory 103 and on which a filtering process is performed to generate a frame decoded image (decoded image per frame), and also outputting the frame decoded image and coding parameters which the frame decoding unit uses when carrying out the prediction difference decoding process (coding parameters multiplexed into the bit sequence data) to the parallel processing switching unit 110-1. The frame decoding unit also carries out a process of outputting the encoded data about the filter parameters showing the filter per frame, the encoded data being multiplexed into the bit sequence data, to the parallel processing switching unit 110-1. The frame decoding unit 105 constructs a frame decoder.

When the corresponding one of the filter parameter share flags #1 to #M separated by the variable length code demultiplexing unit 101 shows that a filter is made to be shared among the tiles, each of filter parameter decoding units 106-1 to 106-M carries out a process of decoding the corresponding one of the encoded data #1 to #M about the filter parameters separated by the variable length code demultiplexing unit 101 into the filter parameters showing the filter per frame, and outputting the filter parameters to the corresponding one of tile loop filtering devices 107-1 to 107-M.

The tile loop filtering devices 107-1 to 107-M carry out filtering processes of types different from one another, and each of the tile loop filtering devices is equipped with N tile loop filter units 107-*m*-1 to 107-*m*-N (m=1, 2, . . . , M) and each of the N tile loop filter units 107-*m*-1 to 107-*m*-N carries out a filtering process independently. M is an integer equal to or larger than 1. When a tile decoded image is outputted from the parallel processing switching unit 110-*m*, each tile loop filter unit 107-*m*-*n* (n=1, 2, . . . , N) decodes the encoded data about the filter parameters outputted from the parallel processing switching unit 110-*m* into the filter parameters showing the filter per tile and carries out a filtering process on the tile decoded image by using the filter per tile when the filter parameter share flag #m separated by the variable length code demultiplexing unit 101 shows that a filter is made not to be shared among the tiles. In contrast, when the filter parameter share flag #m shows that a filter is made to be shared among the tiles, each tile loop filter unit decodes the encoded data about the filter parameters outputted from the parallel processing switching unit 110-*m* into the filter parameters showing the filter per frame and carries out a filtering process on the tile decoded image by using the filter per frame. Each of the plurality of sets of tile loop filter units 107-1-1 to 107-1-N, 107-2-1 to 107-2-N, . . . , and 107-M-1 to 107-M-N constructs tile filters.

When a frame decoded image is outputted from the parallel processing switching unit 110-*m*, each frame loop filter unit 108-*m* decodes the encoded data about the filter parameters outputted from the parallel processing switching unit 110-*m* into the filter parameters showing the filter per frame and carries out a filtering process on the frame decoded image by using the filter per frame. The frame loop filter units 108-1 to 108-M construct a frame filter.

A tile partitioning control unit 109 carries out a process of grasping the partitioning state of the tiles from the tile partitioning control information separated by the variable length code demultiplexing unit 101, and controlling the arrangement of each tile decoded image in a parallel processing ending unit 111 in such a way that a decoded image corresponding to the original inputted image is acquired. Each parallel processing switching unit 110-*m* carries out a process of controlling the connection relationship between the previous-stage processing units and the next-stage processing units according to the loop filter parallel flag #m separated by the variable length code demultiplexing unit 101. As a result, even when the coding parallel flag outputted from the variable length code demultiplexing unit 101 shows that the inputted image is to be partitioned to implement parallelization, if, for example, a filter parameter share flag #x, among the filter parameter share flags #1 to #M separated by the variable length code demultiplexing unit 101, shows that a filter is made to be shared among the tiles, the parallel processing switching unit outputs the decoded image, the coding parameters, and the encoded data about the filter parameters which are outputted from the previous-stage processing unit to the frame loop filter unit 108-*x*, instead of to the tile loop filter unit 107-*x*-*n*.

The parallel processing ending unit 111 carries out a process of combining the tile decoded images on which the filtering processes are performed by the tile loop filter units 107-M-1 to 107-M-N to generate a decoded image per frame under the control of the tile partitioning control unit 109, and storing the decoded image in the motion-compensated prediction frame memory 103. A decoded image storage is comprised of the tile partitioning control unit 109 and the parallel processing ending unit 111.

In the example shown in FIG. 18, it is assumed that each of the variable length code demultiplexing unit 101, the parallel processing starting unit 102, the motion-compensated prediction frame memory 103, the tile decoding device 104, the frame decoding unit 105, the filter parameter decoding units 106-1 to 106-M, the tile loop filtering devices 107-1 to 107-M, the frame loop filter units 108-1 to 108-M, the tile partitioning control unit 109, the parallel processing switching units 110-1 to 110-M, and the parallel processing ending unit 111, which are the components of the video decoding device, consists of dedicated hardware (e.g., a semiconductor integrated circuit equipped with a CPU, a one chip microcomputer, or the like). In a case in which the video decoding device consists of a computer, a program in which the processes carried out by the variable length code demultiplexing unit 101, the parallel processing starting unit 102, the tile decoding device 104, the frame decoding unit 105, the filter parameter decoding units 106-1 to 106-M, the tile loop filtering devices 107-1 to 107-M, the frame loop filter units 108-1 to 108-M, the tile partitioning control unit 109, the parallel processing switching units 110-1 to 110-M, and the parallel processing ending unit 111 are described can be stored in a memory of the computer, and a CPU of the computer can be made to execute the program stored in the memory.

Embodiment 3

The video encoding device in which the tile loop filtering device 7 includes a one-stage loop filter unit is shown in above-mentioned Embodiment 1. A video encoding device according to this Embodiment 3 differs from that according to Embodiment 1 in that tile loop filtering devices 88-1 to 88-M that implement loop filters of types different from one another are connected in a multistage form. For example, in a case in which a deblocking filter, SAO, and ALF are defined as loop filters to be performed on an image, when the image is partitioned into tiles, an encoding process and all filtering processes must be carried out by using a method of not making any reference between tiles. However, there is a case in which it is more convenient to carry out a filtering process on a per frame basis rather than to carry out a filtering process on a per tile basis, depending upon the type of loop filter.

For example, in the case of using ALF, because even one frame of image can be processed at a high speed by H/W, there is no necessity to carry out parallel processing. In contrast, in the case of using a deblocking filter, because it is difficult for H/W to carry out high speed processing, there can be considered a situation in which parallel processing is indispensable. In such a situation, it is desirable that from the viewpoint of image quality, a loop filter that does not need parallelization carries out a filtering process that makes a reference to a pixel over a tile boundary. Further, there is a case in which while it is necessary to parallelize a prediction difference encoding process and a decoding process, it is not necessary to parallelize a loop filtering process. As an alternative, there is an opposite case in which while it is not necessary to parallelize a prediction difference encoding process and a decoding process, it is necessary to parallelize a loop filtering process. In order to deal with these situations, a method of changing whether or not to make a reference to a pixel over a tile boundary is effective for independent parallelization of each of processes including a prediction difference encoding process and a decoding process, and various loop filtering processes.

In this Embodiment 3, switching between partitioning the inputted image and then carrying out a parallelization process on a per tile basis, and carrying out a process on a per frame basis without implementing parallelization can be carried out. Further, for each loop filter, switching between carrying out a filtering process on a per tile basis and carrying out a filtering process on a per frame basis can be carried out.

First, processing carried out by a video encoding device will be explained. An encoding control unit 81 outputs tile partitioning control information indicating a partitioning state to a tile partitioning control unit 82, a parallel processing ending unit 91, and a variable length code multiplexing unit 92 at the time of partitioning an inputted image shown by a video signal into tiles each having a predetermined size, like the encoding control unit 1 shown in FIG. 1. The encoding control unit 81 also outputs a coding parallel flag showing whether or not to partition the inputted image to implement parallelization to a parallel processing starting unit 83, and further outputs filter parameter share flags #1 to #M each showing, for a corresponding one of different types of filtering processes, whether or not a filter for use in the filtering process is made to be shared among the tiles (when a filter is made to be shared among the tiles, the flag is set to ON, otherwise, the flag is set to OFF) to loop filter control units 87-1 to 87-M and the tile loop filtering devices 88-1 to 88-M respectively, and to the variable length code multiplexing unit 92. The encoding control unit 81 further outputs loop filter parallel flags #1 to #M each showing a connection relationship between previous-stage processing units and next-stage processing units to parallel processing switching units 90-1 to 90-M respectively.

When receiving the tile partitioning control information from the encoding control unit 81, the tile partitioning control unit 82 controls the partitioning of the inputted image in the parallel processing starting unit 83 in such a way that the partitioning matches the partitioning state indicated by the tile partitioning control information. When the coding parallel flag outputted from the encoding control unit 81 shows that the inputted image is to be partitioned to implement parallelization, the parallel processing starting unit 83 partitions the inputted image shown by the video signal into tiles each having a predetermined size according to a command from the tile partitioning control unit 82, and distributes the tiles obtained through the partitioning among tile encoding units 85-1 to 85-N. In contrast, when the coding parallel flag shows that the inputted image is not to be partitioned to implement parallelization, the parallel processing starting unit outputs the inputted image which is an image per frame to a frame encoding unit 86 without partitioning the inputted image shown by the video signal.

When receiving a tile from the parallel processing starting unit 83, each of the tile encoding units 85-1 to 85-N generates a tile local decoded image according to the same procedure as that according to which each of the tile encoding units 5-1 to 5-N shown in FIG. 1 does. More specifically, each of the tile encoding units 85-1 to 85-N carries out a prediction difference encoding process on a tile distributed thereto by the parallel processing starting unit 83 by referring to a local decoded image which is stored in a motion-compensated prediction frame memory 84 and on which a filtering process is performed, thereby outputting bit sequence data which is the result of the encoding process and coding parameters, and also generating a tile local decoded image.

When receiving the inputted image which is an image per frame from the parallel processing starting unit 83, the frame encoding unit 86 carries out a prediction difference encoding process on the inputted image by referring to a local decoded image which is stored in the motion-compensated prediction frame memory 84 and on which a filtering process is performed, thereby outputting bit sequence data which is the result of the encoding process and coding parameters, and also generating a frame local decoded image. Although the frame encoding unit differs from the tile encoding units 85-1 to 85-N in that a unit to be processed of the encoding process is a frame, the detailed explanation of the encoding process will be omitted hereafter because the encoding process itself is the same as that carried out by each of the tile encoding units 85-1 to 85-N.

Each parallel processing switching unit 90-$m$ controls the connection relationship between the previous-stage processing units and the next-stage processing units according to the loop filter parallel flag #m outputted from the encoding control unit 81. For example, because the frame encoding unit 86 carries out an encoding process on a per frame basis without the parallel processing starting unit 83 partitioning the inputted image when the coding parallel flag shows that the inputted image is not to be partitioned to implement parallelization, each parallel processing switching unit transmits the output signal (the frame local decoded image, the bit sequence data, and the coding parameters) of the frame encoding unit 86 (or the previous-stage frame loop filter unit) to the next-stage frame loop filter unit. In contrast, when the coding parallel flag shows that the inputted image is to be partitioned to implement parallelization, each parallel processing switching unit transmits the output signal (the tile local decoded image, the bit sequence data, and the coding parameters) of the corresponding one of the tile encoding units 85-1 to 85-N (or the previous-stage tile loop filter unit) to the next-stage tile loop filter unit because a filtering process on a per tile basis is carried out if the filter parameter share flag #m is OFF. However, when a filtering process on a per frame basis is carried out by the loop filter at the (m−1)th stage, each parallel processing switching unit partitions the frame local decoded image outputted from the previous-stage frame loop filter unit into tile local decoded images, and transmits the tile local decoded images, the bit sequence data, and the coding parameters to the next-stage tile loop filter unit.

If the filter parameter share flag #m is ON even when the coding parallel flag shows that the inputted image is to be partitioned to implement parallelization, because a filtering process on a per frame basis is carried out by the loop filter at the mth stage, each parallel processing switching unit transmits the output signal (the tile local decoded image, the bit sequence data, and the coding parameters) of the corresponding one of the tile encoding units 85-1 to 85-N (or previous-stage tile loop filter unit) or the output signal (the frame local decoded image, the bit sequence data, and the coding parameters) of the previous-stage frame loop filter unit to the next-stage frame loop filter unit.

When the filter parameter share flag #m outputted from the encoding control unit 81 is ON, each loop filter control unit 87-$m$ acquires a frame local decoded image from the tile local decoded image outputted from the parallel processing switching unit 90-$m$ and determines a filter per frame suitable for the frame local decoded image. When a frame local decoded image is outputted from the parallel processing switching unit 90-$m$, each loop filter control unit determines a filter per frame suitable for the frame local decoded image. After determining a filter per frame, each loop filter control unit 87-$m$ outputs filter parameters showing the filter to the tile loop filtering device 88-$m$. Each loop filter control unit 87-$m$ also variable-length-encodes the filter parameters showing the filter per frame, and outputs encoded data about the filter parameters to the parallel processing ending unit 91.

When receiving the tile local decoded image from the parallel processing switching unit 90-*m*, each tile loop filter unit 88-*m*-*n* determines a filter per tile suitable for a filtering process on the tile local decoded image on the basis of the coding parameters which are outputted from the parallel processing switching unit 90-*m* when the filter parameter share flag #m outputted from the encoding control unit 81 is OFF, like each tile loop filter unit 7-*n* shown in FIG. 1, and carries out a filtering process on the tile local decoded image by using the filter and outputs the tile local decoded image on which the tile loop filter unit carries out the filtering process to the next-stage parallel processing switching unit or the parallel processing ending unit 91. Each tile loop filter unit 88-*m*-*n* also variable-length-encodes the filter parameters showing the filter per tile, multiplexes encoded data about the filter parameters into the bit sequence data outputted from the parallel processing switching unit 90-*m*, and outputs the bit sequence data to the next-stage parallel processing switching unit or the parallel processing ending unit 91.

When the filter parameter share flag #m outputted from the encoding control unit 81 is ON, each tile loop filter unit carries out a filtering process on the tile local decoded image outputted from the parallel processing switching unit 90-*m* by using the filter per frame shown by the filter parameters outputted from the loop filter control unit 87-*m*. However, in this Embodiment 3, even when the coding parallel flag shows that the inputted image is to be partitioned to implement parallelization, because each parallel processing switching unit 90-*m* provides the frame local decoded image for the frame loop filter unit 89-*m*, but does not provide the tile local decoded image for the tile loop filter unit 88-*m*-*n* when the filter parameter share flag #m is ON, each tile loop filter unit does not carry out a filtering process on the tile local decoded image by using the filter per frame in this situation. As a situation in which each tile loop filter unit 88-*m*-*n* carries out a filtering process on the tile local decoded image by using the filter per frame, for example, there can be considered a situation in which the encoding control unit 81 stopped the function of the frame loop filter unit 89-*m* and holds this function at rest without using the function of outputting the coding parallel flag (structure similar to that according to Embodiment 1).

When receiving the tile local decoded image from the parallel processing switching unit 90-*m*, each frame loop filter unit 89-*m* acquires a frame local decoded image from the tile local decoded image, and determines a filter per frame suitable for a filtering process on the frame local decoded image on the basis of the coding parameters outputted from the parallel processing switching unit 90-*m*. When a frame local decoded image is outputted from the parallel processing switching unit 90-*m*, each frame loop filter unit determines a filter per frame suitable for the frame local decoded image on the basis of the coding parameters. After determining a filter per frame, each frame loop filter unit 89-*m* carries out a filtering process on the frame local decoded image by using the filter per frame, and outputs the frame local decoded image on which the frame loop filter unit carries out the filtering process to the next-stage parallel processing switching unit or the parallel processing ending unit 91. Each frame loop filter unit 89-*m* also variable-length-encodes filter parameters showing the filter per frame, multiplexes encoded data about the filter parameters into the bit sequence data outputted from the parallel processing switching unit 90-*m*, and outputs the bit sequence data to the next-stage parallel processing switching unit or the parallel processing ending unit 91.

When the coding parallel flag outputted from the encoding control unit 81 shows that the inputted image is to be partitioned to implement parallelization, and the filter parameter share flag #M outputted from the encoding control unit 81 is OFF, the parallel processing ending unit 91 combines the tile local decoded images on which the filtering processes are carried out by the tile loop filter units 88-M-1 to 88-M-N to generate a local decoded image per frame according to the tile partitioning control information outputted from the encoding control unit 81, and stores the local decoded image in the motion-compensated prediction frame memory 84, and also outputs the bit sequence data outputted from the tile loop filter units 88-M-1 to 88-M-N to the variable length code multiplexing unit 92. Further, when the coding parallel flag shows that the inputted image is to be partitioned to implement parallelization, and the filter parameter share flag #M outputted from the encoding control unit 81 is ON, the parallel processing ending unit stores the frame local decoded image on which the filtering process is carried out by the frame loop filter unit 88-M in the motion-compensated prediction frame memory 84, and also outputs the bit sequence data outputted from the frame loop filter unit 88-M to the variable length code multiplexing unit 92. In contrast, when the coding parallel flag shows that the inputted image is not to be partitioned to implement parallelization, the parallel processing ending unit stores the frame local decoded image on which the filtering process is carried out by the frame loop filter unit 88-M in the motion-compensated prediction frame memory 84, and also outputs the bit sequence data outputted from the frame loop filter unit 88-M to the variable length code multiplexing unit 92.

The variable length code multiplexing unit 92 multiplexes the bit sequence data outputted from the parallel processing ending unit 91, and the tile partitioning control information, the coding parallel flag, the loop filter parallel flags #1 to #M, and the filter parameter share flags #1 to #M which are outputted from the encoding control unit 81 to generate a bitstream.

Next, processing carried out by a video decoding device will be explained. When receiving the bitstream generated by the video encoding device shown in FIG. 17, a variable length code demultiplexing unit 101 demultiplexes the bitstream into the bit sequence data, the tile partitioning control information, the coding parallel flag, the loop filter parallel flags #1 to #M, the filter parameter share flags #1 to #M, and the encoded data about the filter parameters, which are multiplexed into the bitstream, and outputs them.

When the coding parallel flag separated by the variable length code demultiplexing unit 101 shows that the inputted image is partitioned to implement parallelization, a parallel processing starting unit 102 divides the bit sequence data per frame outputted from the variable length code demultiplexing unit 101 into a plurality of bit sequence data per tile, and distributes these bit sequence data per tile among tile decoding units 104-1 to 104-N. In contrast, when the coding parallel flag shows that the inputted image is not partitioned to implement parallelization, the parallel processing starting unit outputs the bit sequence data per frame outputted from the variable length code demultiplexing unit 101 to a frame decoding unit 105.

When receiving bit sequence data per tile from the parallel processing starting unit 102, each of the tile decoding units 104-1 to 104-N generates a tile decoded image according to the same procedure as that according to which each of the tile decoding units 54-1 to 54-N shown in FIG. 6 does. More specifically, each of the tile decoding units 104-1 to 104-N carries out a prediction difference decoding process on bit sequence data per tile distributed thereto by the parallel processing starting unit 102 by referring to a decoded image stored in a motion-compensated prediction frame memory 103 and on which a filtering process is performed to generate a tile decoded image, and also outputs the tile decoded image and coding parameters which the tile decoding unit uses when carrying out the prediction difference decoding process (coding parameters multiplexed into the bit sequence data) to a parallel processing ending unit 111. Each of the tile decoding units also carries out a process of outputting the encoded data about the filter parameters showing the filter per tile which is multiplexed into the bit sequence data to a parallel processing switching unit 110-1.

When receiving the bit sequence data per frame from the parallel processing starting unit 102, the frame decoding unit 105 carries out a prediction difference decoding process on the bit sequence data per frame by referring to a local decoded image which is stored in the motion-compensated prediction frame memory 103 and on which a filtering process is carried out, thereby generating a frame decoded image, and outputs the frame decoded image and coding parameters which the frame decoding unit uses when carrying out the prediction difference decoding process (coding parameters multiplexed into the bit sequence data) to the parallel processing ending unit 111. The frame decoding unit also carries out a process of outputting the encoded data about the filter parameters showing the filter per frame multiplexed into the bit sequence data to the parallel processing switching unit 110-1.

Each parallel processing switching unit 90-$m$ controls a connection relationship between previous-stage processing units and next-stage processing units according to the loop filter parallel flag #m separated by the variable length code demultiplexing unit 101. For example, because the frame decoding unit 105 carries out a decoding process on a per frame basis without the parallel processing starting unit 102 dividing the bit sequence data per frame into a plurality of bit sequence data per tile when the coding parallel flag shows that the inputted image is not partitioned to implement parallelization, each parallel processing switching unit transmits the output signal (the frame decoded image, the coding parameters, and the encoded data about the filter parameters showing the filter per frame) of the frame decoding unit 105 (or the previous-stage frame loop filter unit) to the next-stage frame loop filter unit. In contrast, when the coding parallel flag shows that the inputted image is partitioned to implement parallelization, each parallel processing switching unit transmits the output signal (the tile decoded image, the coding parameters, and the encoded data about the filter parameters showing the filter per tile) of the corresponding one of the tile decoding units 104-1 to 104-N (or the previous-stage tile loop filter unit) to the next-stage tile loop filter unit because a filtering process on a per tile basis is carried out if the filter parameter share flag #m is OFF. However, when a filtering process on a per frame basis is carried out by the loop filter at the (m−1)th stage, each parallel processing switching unit partitions the frame decoded image outputted from the previous-stage frame loop filter unit into tile decoded images, and transmits the tile decoded images, the coding parameters, and the encoded data about the filter parameters showing the filter per tile to the next-stage tile loop filter unit.

If the filter parameter share flag #m is ON even when the coding parallel flag shows that the inputted image is partitioned to implement parallelization, because a filtering process on a per frame basis is carried out by the loop filter at the mth stage, each parallel processing switching unit transmits the output signal (the tile decoded image, the coding parameters, and the encoded data about the filter parameters showing the filter per tile) of the corresponding one of the tile decoding units 104-1 to 104-N (or previous-stage tile loop filter unit) or the output signal (the frame decoded image, the coding parameters, and the encoded data about the filter parameters showing the filter per frame) of the previous-stage frame loop filter unit to the next-stage frame loop filter unit.

When the filter parameter share flag #n separated by the variable length code demultiplexing unit 101 is ON, each filter parameter decoding unit 106-$m$ decodes the encoded data #m about the filter parameters separated by the variable length code demultiplexing unit 101 into the filter parameters showing the filter per frame, and outputs the filter parameters to a tile loop filtering device 107-$m$.

When receiving a tile decoded image from the parallel processing switching unit 110-$m$, each tile loop filter unit 107-$m$-$n$ decodes the encoded data about the filter parameters outputted from the parallel processing switching unit 110-$m$ into the filter parameters showing the filter per tile, and carries out a filtering process on the tile decoded image by using the filter per tile when the filter parameter share flag #m separated by the variable length code demultiplexing unit 101 is OFF. When the filter parameter share flag #m is ON, each tile loop filter unit carries out a filtering process on the tile decoded image by using the filter per frame shown by the filter parameters outputted from the filter parameter decoding unit 106-$m$. However, in this Embodiment 3, even when the coding parallel flag shows that the inputted image is partitioned to implement parallelization, because each parallel processing switching unit 110-$m$ provides the frame local decoded image for the frame loop filter unit 108-$m$, but does not provide the tile decoded image for the tile loop filter unit 107-$m$-$n$ when the filter parameter share flag #m is ON, each tile loop filter unit does not carry out a filtering process on the tile decoded image by using the filter per frame in this situation. As a situation in which each tile loop filter unit 107-$m$-$n$ carries out a filtering process on the tile decoded image by using the filter per frame, for example, there can be considered a situation in which the encoding side stopped the function of the frame loop filter unit 108-$m$ and holds this function at rest without using the function of outputting the coding parallel flag (structure similar to that according to Embodiment 1).

When receiving the frame decoded image from the parallel processing switching unit 110-$m$, each frame loop filter unit 108-$m$ decodes the encoded data about the filter parameters outputted from the parallel processing switching unit 110-$m$ into the filter parameters showing the filter per frame, and carries out a filtering process on the frame decoded image by using the filter per frame.

A tile partitioning control unit 109 carries out a process of grasping the partitioning state of the tiles from the tile partitioning control information separated by the variable length code demultiplexing unit 101, and controlling the arrangement of each tile decoded image in the parallel processing ending unit 111 in such a way that a decoded image corresponding to the original inputted image is acquired. When the coding parallel flag separated by the variable length code demultiplexing unit 101 shows that the inputted image is partitioned to implement parallelization, and the filter parameter share flag #M separated by the variable length code demultiplexing unit 101 is OFF, the parallel processing ending unit 111 combines the tile decoded images on which the filtering processes are carried out by the tile loop filter units 107-M-1 to 107-M-N to generate a decoded image per frame under the control of the tile partitioning control unit 109, and stores the decoded image in the motion-compensated prediction frame memory 103. Further, when the coding parallel flag shows that the inputted image is partitioned to implement parallelization, and the filter parameter share flag #M is ON, the parallel processing ending unit stores the frame decoded image on which the filtering process is carried out by the frame loop filter unit 108-M in the motion-compensated prediction frame memory 103. In contrast, when the coding parallel flag shows that the inputted image is not partitioned to implement parallelization, the parallel processing ending unit stores the frame decoded image on which the filtering process is carried out by the frame loop filter unit 108-M in the motion-compensated prediction frame memory 103. As can be seen from the above description, in accordance with this Embodiment 3, switching between partitioning the inputted image and then carrying out a parallelization process on a per tile basis, and carrying out a process on a per frame basis without implementing parallelization can be carried out, and, for each loop filter unit, switching between carrying out a filtering process on a per tile basis and carrying out a filtering process on a per frame basis can be carried out. Therefore, there is provided an advantage of being able to speed up the processing even when loop filters of different types are connected in a multistage form to improve the entire filter performance.

While the invention has been described in its preferred embodiments, it is to be understood that an arbitrary combination of two or more of the above-mentioned embodiments can be made, various changes can be made in an arbitrary component according to any one of the above-mentioned embodiments, and an arbitrary component according to any one of the above-mentioned embodiments can be omitted within the scope of the invention.

INDUSTRIAL APPLICABILITY

Because the video encoding device, the video decoding device, the video encoding method, and the video decoding method in accordance with the present invention make it possible to generate a local decoded image per tile, determine a filter per tile suitable for the local decoded image, carry out a filtering process on the local decoded image by using the filter per tile, and carry out loop filtering processes in parallel on a tile level, the present invention can be applied to a video encoding device for and a video encoding method of compression-encoding and transmitting an image and to a video decoding device for and a video decoding method of decoding the encoded data transmitted by the video encoding device into an image.

EXPLANATIONS OF REFERENCE NUMERALS 1 encoding control unit (partitioning controller), 2 tile partitioning control unit (tile distributor), 3 parallel processing starting unit (tile distributor), 4 motion-compensated prediction frame memory (image memory), 5 tile encoding device, 5-1 to 5-N tile encoding unit (tile encoder), 6 loop filter control unit (per-frame filter determinator), 7 tile loop filtering device, 7-1 to 7-N tile loop filter unit (tile filter), 8 parallel processing ending unit (local decoded image storage), 9 variable length code multiplexing unit (multiplexer), 21 tile encoding control unit, 22 block partitioning unit, 23 select switch, 24 intra prediction unit, 25 motion-compensated prediction unit, 26 subtracting unit, 27 transformation/quantization unit, 28 inverse quantization/inverse transformation unit, 29 adding unit, 30 tile local decoded image memory, 31 variable length encoding unit, 41 tile loop filter control unit, 42 loop filter performing unit, 43 variable length encoding unit, 51 variable length code demultiplexing unit (demultiplexer), 52 parallel processing starting unit (encoded bit data distributor), 53 motion-compensated prediction frame memory (image memory), 54 tile decoding device, 54-1 to 54-N tile decoding unit (tile decoder), 55 filter parameter decoding unit, 56 tile loop filtering device, 56-1 to 56-N tile loop filter unit (tile filter), 57 tile partitioning control unit (decoded image storage), 58 parallel processing ending unit (decoded image storage), 61 variable length decoder, 62 select switch, 63 intra prediction unit, 64 motion compensation unit, 65 inverse quantization/inverse transformation unit, 66 adding unit, 67 tile decoded image memory, 71 tile filter parameter decoding unit, 72 loop filter performing unit, 81 encoding control unit (partitioning controller), 82 tile partitioning control unit (tile distributor), 83 parallel processing starting unit (tile distributor), 84 motion-compensated prediction frame memory (image memory), 85 tile encoding device, 85-1 to 85-N tile encoding unit (tile encoder), 86 frame encoding unit (frame encoder), 87-1 to 87-M loop filter control unit, 88-1 to 87-M tile loop filtering device, 88-1-1 to 88-1-N, 88-2-1 to 88-2-N, . . . , and 88-M-1 to 88-M-N tile loop filter unit (tile filter), 89-1 to 89-M frame loop filter unit (frame filter), 90-1 to 90-M parallel processing switching unit, 91 parallel processing ending unit (local decoded image storage), 92 variable length code multiplexing unit (multiplexer), 101 variable length code demultiplexing unit (demultiplexer), 102 parallel processing starting unit (encoded bit data distributor), 103 motion-compensated prediction frame memory (image memory), 104 tile decoding device, 104-1 to 104-N tile decoding unit (tile decoder), 105 frame decoding unit (frame decoder), 106-1 to 106-M filter parameter decoding unit, 107-1 to 107-M tile loop filtering device, 107-1-1 to 107-1-N, 107-2-1 to 107-2-N, . . . , and 107-M-1 to 107-M-N tile loop filter unit (tile filter), 108-1 to 108-M frame loop filter unit (frame filter), 109 tile partitioning control unit (decoded image storage), 110-1 to 110-M parallel processing switching unit, 111 parallel processing ending unit (decoded image storage).

The invention claimed is:

1. A video decoding device comprising:
an encoded bit data distributor that separates encoded bit data separated from a bitstream into encoded bit data of tile;
one or more tile decoders each of which carries out a prediction difference decoding process on encoded bit data of tile separated by the encoded bit data distributor to generate a decoded image of tile; and
one or more tile filters each of which carries out a filtering process on the decoded image generated by one of the one or more tile decoders by using a filter per tile shown by a filter parameter separated from the bitstream;
wherein said device decodes a video data bitstream including encoded bit data and the filter parameter; and
wherein the video decoding device includes:
a demultiplexer that demultiplexes the bitstream into the encoded bit data, filter parameters each showing a filter per a tile which is a rectangular region having a predetermined size, and partitioning control information indicating a partitioning state of an inputted image, which are multiplexed into the bitstream;
an image memory that stores a decoded image on which a filtering process is carried out; and a decoded image storage that combines the decoded image on which the filtering process is carried out by the one or more tile filters to generate a decoded image of frame according to the partitioning control information separated by the demultiplexer, and that stores the decoded image in the image memory.

* * * * *